US007950043B2

(12) United States Patent
Aoki et al.

(10) Patent No.: US 7,950,043 B2
(45) Date of Patent: May 24, 2011

(54) DIGITAL BROADCAST SYSTEM, RECEIVING APPARATUS AND TRANSMITTING APPARATUS

(75) Inventors: Hirosi Aoki, Hiroshima (JP); Sigenori Doi, Hiroshima (JP)

(73) Assignee: Panasonic Corporation, Osaka (JP)

( * ) Notice: Subject to any disclaimer, the term of this patent is extended or adjusted under 35 U.S.C. 154(b) by 487 days.

(21) Appl. No.: 12/091,133

(22) PCT Filed: Nov. 2, 2006

(86) PCT No.: PCT/JP2006/321949
§ 371 (c)(1),
(2), (4) Date: Apr. 22, 2008

(87) PCT Pub. No.: WO2007/052736
PCT Pub. Date: May 10, 2007

(65) Prior Publication Data
US 2009/0138934 A1    May 28, 2009

(30) Foreign Application Priority Data

Nov. 2, 2005   (JP) ................. 2005-319749

(51) Int. Cl.
*H04N 7/173*  (2011.01)
*H04N 7/16*   (2011.01)
*H04N 7/00*   (2011.01)
*H04N 11/00*  (2006.01)
*H04N 7/04*   (2006.01)
*G06F 17/00*  (2006.01)
*G06F 17/20*  (2006.01)
*G06F 17/21*  (2006.01)
*G06F 17/22*  (2006.01)
*G06F 17/24*  (2006.01)
*G06F 17/25*  (2006.01)
*G06F 17/26*  (2006.01)
*G06F 17/27*  (2006.01)

(52) U.S. Cl. ........ 725/131; 348/468; 348/465; 348/469; 715/269; 725/135

(58) Field of Classification Search .................. 348/468, 348/465, 469; 725/32, 39–40, 48, 63, 68, 725/120, 131, 135, 137, 139, 151; 715/269
See application file for complete search history.

(56) References Cited

U.S. PATENT DOCUMENTS

2003/0086690 A1    5/2003   Chung et al.
(Continued)

FOREIGN PATENT DOCUMENTS
EP          1267273       12/2002
(Continued)

OTHER PUBLICATIONS

Multimedia Home Platform—Srandard 1.0.1 (Institut Fur Rundfunktechnik IRT) R. Sedlmeyer, 2001.*

(Continued)

*Primary Examiner* — Hai Tran
(74) *Attorney, Agent, or Firm* — Greenblum & Bernstein, P.L.C.

(57) ABSTRACT

The receiving apparatus of the present invention includes: a reception unit which receives a broadcast; an output unit which outputs a service included in the received broadcast; an execution unit which executes an application program included in the received broadcast; an extraction unit which extracts, from service information included in the received broadcast, a font identifier which is information for identifying font data corresponding to the service; a switch detection unit which detects that a currently outputted service is switched; a connection unit which adopts, as font data to be used by the application program, font data identified by the font identifier corresponding to the currently outputted service that is detected; and a rendering unit which renders the font data to be used by the application program.

11 Claims, 31 Drawing Sheets

U.S. PATENT DOCUMENTS

| | | |
|---|---|---|
| 2005/0117886 A1 | 6/2005 | Kang et al. |
| 2006/0056819 A1 | 3/2006 | Schiller et al. |
| 2006/0120523 A1 | 6/2006 | Kurotaki |
| 2006/0248561 A1 | 11/2006 | Hashimoto et al. |
| 2006/0269222 A1 | 11/2006 | Horii |
| 2007/0022452 A1 | 1/2007 | Yamamuro et al. |
| 2007/0140650 A1 | 6/2007 | Suzuki |

FOREIGN PATENT DOCUMENTS

| | | |
|---|---|---|
| EP | 1420580 | 5/2004 |
| WO | 2004/047431 | 6/2004 |
| WO | 2004/056115 | 7/2004 |
| WO | 2005/045833 | 5/2005 |

OTHER PUBLICATIONS

The DVB Multimedia Home Platform (MHP) and Related Specifications (Ieee vol. 94, No. 1, Jan. 2006) Jon Piesing.*

English language Abstract of JP 2003-100056.

English language Abstract of JP 2002-142000.

ETSI TS 101 812 V1.3.1 (Jun. 2003) Digital Video Broadcasting (DVB); Multimedia Home Platform (MHP) Specification 1.0.3, pp. 55-56, 330-348, 358.

* cited by examiner

FIG. 3

| Service ID | Font File Name |
|---|---|
| 20 | NewsGothic. pfr |
| 21 | ComicSans. pfr |
| 22 | MovieSerif. pfr |

FIG. 17

```
1:  import javax.tv.-xlet.*;
2:  import java.awt.*;
3:  import org.havi.ui.*;
4:  import org.dvb.ui.*;
5:
6:  public class App-abl extends Component implements Xlet {
7:    public void destroyXlet (boolcan unconditional) {
8:    }
9:    public void initXlet (XletContext ctx) {
10:     Font f - new Font("DEF", FONT.PLAIN, 32);
11:     this.sctFont(f);
12:   }
13:   public void startXlet () throws XletStateChangeException {
14:     try{
15:       org.havi.ui.HScene scene - HSceneFactory.getInstance().getBestScene(null);
16:       scene.setVisible(true);
17:       scene.show();
18:       scene.setActive(true);
19:       this.setBounds(0,0,720,576);
20:       scene.add(this);
21:       scene.requestFocus();
22:       scene.repaint();
23:     } catch(Exception ex) {
24:     }
25:   }
26:   public void pauseXlet () {
27:   }
28:   public void paint(Graphics g) {
29:     try{
30:       g.setColor(new DVBColor(0xFF, 0x0, 0x0. 0xFF));
31:       g.drawString (" Hello World,¥n", 50,50);
32:     } catch(Exeption ex) {
33:     }
34:   }
35: }
```

FIG. 19

| Schedule Number | original _network _ID | transport _stream _ID | service _ID | Start Time | Duration | Presentation ID | Java Application File Name | Font File Name |
|---|---|---|---|---|---|---|---|---|
| 1 | 0x01 | 0x02 | 0x22 | 8:00 | 30 minutes | 11. 21 | App-ab1.class | ComisSans.pfr |
| 2 | 0x01 | 0x02 | 0x22 | 8:30 | 30 minutes | 11. 21 | App-ab1.class | MovieSerif.pfr |
| 3 | 0x01 | 0x02 | 0x22 | 9:00 | 30 minutes | 15. 25. 26 | App-ab1.class | MovieSerif.pfr |

FIG. 20

| PMT-a1 |
|---|
| Program number 0x22 |
| Version number 0 |
| Descriptor: Font identifier |
| ComicSans.pfr |
| Type: Video |
| PID:0x1201 |
| Type: Audio |
| PID:0x1301 |
| Type:AIT |
| PID:0x1401 |
| Type:DSM-CC |
| PID:0x1501 |

(A)

| PMT-a1 |
|---|
| Program number 0x22 |
| Version number 1 |
| Descriptor: Font identifier |
| MovieSerif.pfr |
| Type: Video |
| PID:0x1201 |
| Type: Audio |
| PID:0x1301 |
| Type:AIT |
| PID:0x1401 |
| Type:DSM-CC |
| PID:0x1501 |

| Title Name | Animation Match-up |
|---|---|
| AV Data | VIDEO_TS.ts |
| Start-up Application | App-ab1.class |
| Font Identifier | ComicSans.pfr |

(A) 0001.bdjo

| Title name | Movie Review |
|---|---|
| AV Data | VIDEO_TS-2.ts |
| Start-up Application | App-ab1.class |
| Font Identifier | MovieSerif.pfr |

(B) 0002.bdjo

DIGITAL BROADCAST SYSTEM, RECEIVING APPARATUS AND TRANSMITTING APPARATUS

TECHNICAL FIELD

The present invention relates to receiving apparatuses for receiving broadcasts and, in particular, to a mechanism in which a font to be used by an application program included in a broadcast is changed according to a service and the like when a receiving apparatus executes the application program.

BACKGROUND ART

Conventionally, in a digital broadcast system in which an application program is downloaded and executed, there is a technique for changing a font to be used by the application program according to a service. For example, in the case of executing an application program that displays current time, as shown in FIGS. 1(A) and (B), when service (channel) S is changed, current time T is displayed in a font according to the service S.

The technique concerning the digital broadcast system in which the application program is downloaded and executed is prescribed by the DVB-MHP standard (refer to non-Patent Reference 1), which is the European digital TV standard, and it is a publicly known technique. The DVB-MHP standard employs the Abstract Window Toolkit (AWT), which is the Java™ class library, as an API which uses fonts preinstalled in a terminal. In addition, an API which uses fonts that are not preinstalled in the terminal is also prescribed. For the details, refer to the DVB-MHP standard.

The following gives an outline of a mechanism for using the fonts that are not preinstalled in the terminal. Here, what is specified in the DVB-MHP standard will be described.
<General Functional Structure>

FIG. 2 is a block diagram showing a general functional structure of a typical terminal compliant with the DVB-MHP standard.

Data in a TS signal 101 is decoded by a TS processing unit 102. Each piece of the decoded data is recorded in respective dedicated memories based on a type of the each piece of data. Font data and an Xlet are recorded in a file system recording memory 103, service information is recorded in a service information recording memory 104, and AV data is recorded in an AV recording memory 105, respectively. The Xlet is a program expressed in the Java™ bytecode.

A service information processing unit 108 processes the information service recorded in the service information recording memory 104, and instructs a presentation processing unit 109 to reproduce (output) AV data and a program processing unit 107 to start an Xlet.

The presentation processing unit 109 has decoders corresponding to video, audio, and caption respectively, and decodes the AV data recorded in the AV recording memory 105 and outputs the decoded AV data to a video plane 113 under the instruction of the service information processing unit 108.

The program processing unit 107 includes the Java™ virtual machine, and executes the Xlet recorded in the file system recording memory 103. This Xlet includes a bytecode that generates and uses the fonts that are not preinstalled in the terminal. Specifically, a font generation mechanism based on the org.dvb.ui.FontFactory class prescribed in the DVB-MHP standard is used. The program processing unit reads the bytecode of the Xlet, instructs a FontObject generation unit 106 to generate a FontObject so that the fonts that are not preinstalled in the terminal become available, and receives the resulting FontObject from the FontObject generation unit 106. Further, the program processing unit 107 instructs a font processing unit 111 to render the FontObject.

Under the instruction of the program processing unit 107, the FontObject generation unit 106 generates, from the font data recorded in the file system recording memory 103, a FontObject compatible with java.awt.Font of the AWT and a font face which is rendering information of the FontObject; makes a pair of these; and records it in a FontObject recording memory 110. In the FontObject recording memory 110, an area where at least the FontObject is recorded is a heap area of the Java™ virtual machine.

Under the FontObject rendering instruction of the program processing unit 107, the Font processing unit 111 obtains the font face paired with the FontObject and outputs it to a graphics plane 112.

The graphics plane 112 and the video plane 113 are synthesized by a synthesis processing unit 114 and outputted to a TV receiver and the like.
<Mechanism for Changing Font to be Used According to Service>

Next, a mechanism for changing a font to be used by the terminal according to a service will be described.

An Xlet to be executed by the program processing unit 107 includes association information between a service and font information. Furthermore, the Xlet includes the bytecode that changes the font to be used when a reproduction service changes.

FIG. 3 is a diagram showing an example of the association information between the service and the font information. As shown in this figure, the association information is information in which a service ID and a font file name are associated with each other. By using the association information, it becomes possible to specify the font to be used when the reproduction service is decided.

The program processing unit 107 reads the bytecode of the Xlet, obtains a service ID in currently reproduction from the service information processing unit 108, and instructs the FontObject generation unit 106 to generate a FontObject after the font to be used is determined based on the association information. That is to say, when the reproduction service changes, the program processing unit 107 obtains a service ID of the changed reproduction service from the service information processing unit 108, and instructs the FontObject generation unit 106 to generate a FontObject after the font to be used is determined based on the association information.
Non-Patent Reference 1: ETSI TS 101 812 DVB-MHP Specification V1.0.3.

DISCLOSURE OF INVENTION

Problems that Invention is to Solve

In the conventional technique, the Xlet includes the bytecode that newly generates a FontObject when the reproduction service changes. Stated differently, a description of the Xlet becomes complicated.

Moreover, in the conventional technique, the Xlet includes the association information between the service and the font information. Accordingly, it is impossible to specify a font to be used for a service not-included in the association information. To put it differently, it is necessary to modify the Xlet in order to specify a font to be used for a new service.

The present invention has been devised in view of the above-mentioned problems, and has an object of providing the mechanism for changing the font to be used according to the service although the Xlet does not include the bytecode that newly generates the FontObject when the reproduction service changes and also although the Xlet does not include the association information between the service and the font information.

Means to Solve the Problems

In order to solve the above-mentioned conventional problems, the receiving apparatus of the present invention is a receiving apparatus which receives a broadcast, and includes: a reception unit operable to receive the broadcast; an output unit operable to output a service included in the received broadcast; an execution unit operable to execute an application program included in the received broadcast; an extraction unit operable to extract, from service information included in the received broadcast, a font identifier which is information for identifying font data corresponding to the service; a switch detection unit operable to detect that a currently outputted service is switched; a connection unit operable to adopt, as font data to be used by the application program, font data identified by the font identifier corresponding to the currently outputted service to which switching is detected by the switch detection unit; a recording medium on which the font identifier corresponding to the currently outputted service is recorded after the switching is detected by said switch detection unit; and a rendering unit operable to render the font data to be used by the application program. The switch detection unit detects the switching by comparing the font identifier recorded in the recording medium and the font identifier extracted by the extraction unit. Accordingly, although the application program does not include a process code which processes font data for each unit of viewing (specifically, a process code which generates a FontObject and a process code which designates a font file), it becomes possible to change font data to be used for each unit of viewing.

Here, the application program may generate a virtual FontObject which is an insubstantial FontObject, and the connection unit may adopt the font data identified by the font identifier, as the font data to be used by the application program, by connecting the font data identified by the font identifier to the virtual FontObject. Accordingly, when the application program only includes a simple process code which generates the virtual FontObject, it becomes possible to change font data to be used for each unit of viewing.

Moreover, the extraction unit may extract the font identifier from a Program Map Table (PMT), a Service Description Table (SDT) or an Event Information Table (EIT), each of which is included in the received broadcast. Extracting the font identifier from these tables allows the application program to use the font data identified by the font identifier.

Furthermore, the receiving apparatus may further include a recording unit which caches a Program Map Table (PMT), a Service Description Table (SDT) or an Event Information Table (EIT), each of which is included in the received broadcast. The extraction unit may extract the font identifier from the cached PMT, SDT or EIT. When the PMT and the like are cached in this manner, it becomes possible to reduce delay of a time from when a service is switched until when a font is switched.

In addition, the application program may generate the virtual FontObject at a time of service switching or font rendering. Even when a timing for generating the virtual FontObject is at a time of service switching or font rendering, the same effect can be obtained.

Moreover, the connection unit may adopt, as the font data to be used by the application program, the font data identified by the font identifier, at a time of service switching or font rendering. Even when a timing for adopting, as font data to be used by the application program, font data identified by the font identifier is at a time of service switching or font rendering, the same effect can be obtained.

According to a non-limiting embodiment of the present disclosure, an output device includes characteristic units included in the receiving apparatus, a reception method includes characteristic units, and a program causes a computer to execute characteristic steps. Additionally, the program can be distributed via a recording medium such as a CD-ROM.

DISCLOSURE OF INVENTION

As described above, according to the present invention, although the application program does not include the process code which processes font data for each unit of viewing (specifically, a process code which generates a FontObject and a process code which designates a font file), it becomes possible to change font data to be used for each unit of viewing. Thus, a description of the application program becomes simpler than before. Furthermore, since a structure in which association information between a service and font information is included in the application program is not adopted, it is not necessary to modify the application program even in the case of using a new service.

BRIEF DESCRIPTION OF DRAWINGS

FIG. 3 is a diagram showing an example of association information between a service and font information.

FIG. 17 is a source code of an application program.

FIG. 19 is a diagram showing an example of service schedule information.

FIGS. 20(A) and (B) is a view showing a frame format of a data structure of a PMT.

FIGS. 28(A) and (B) is a view showing a frame format of a data structure of a table for identifying a unit of viewing.

NUMERICAL REFERENCES

Figure 1:
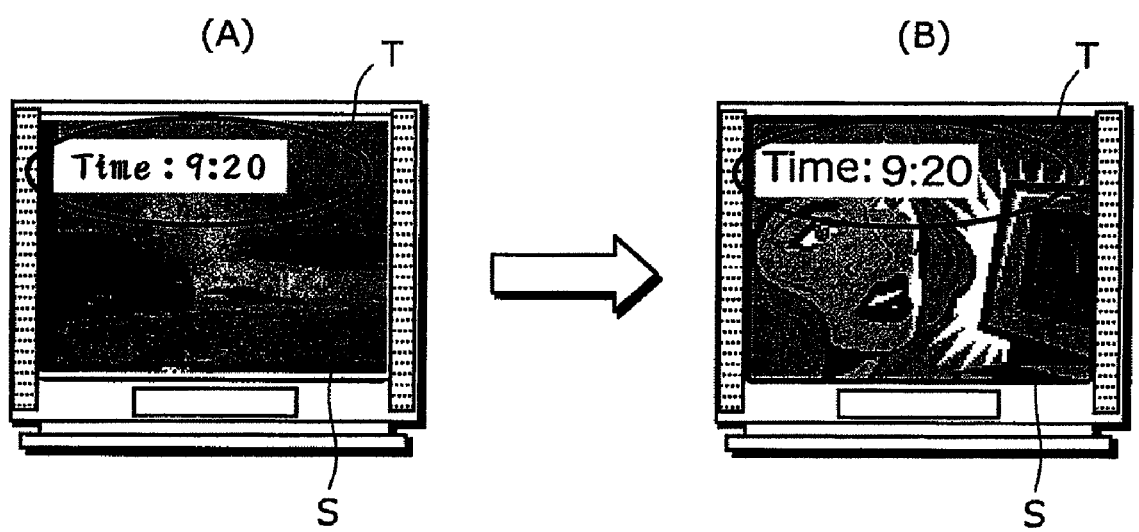
FIGS. 1(A) and (B) is a diagram showing a situation where current time is displayed on a screen.
Figure 2:
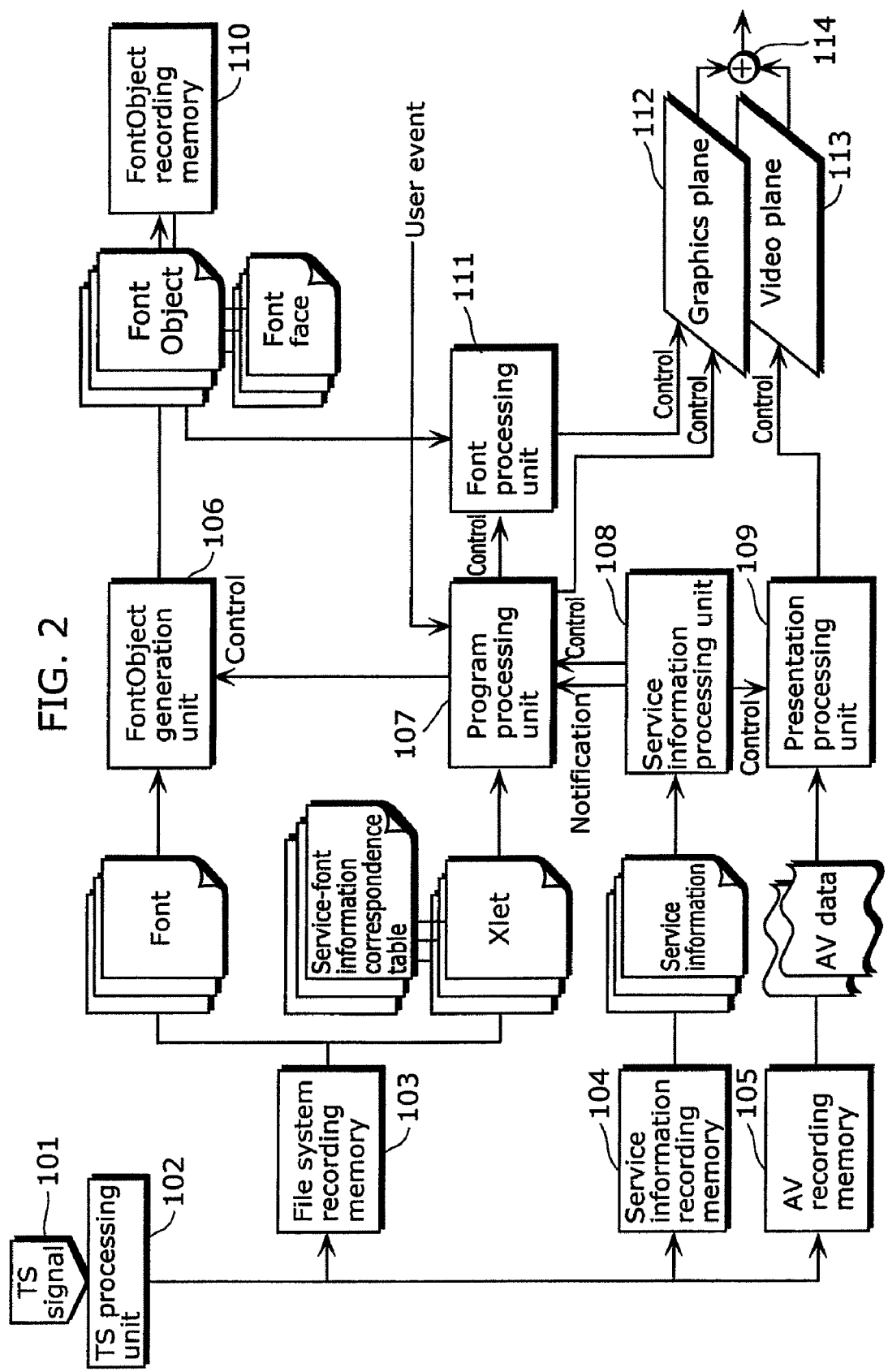
FIG. 2 is a schematic block diagram of a conventional receiving apparatus.

101 TS signal
102 TS processing unit
103 File system recording memory
104 Service information recording memory
105 AV recording memory
106 FontObject generation unit
107 Program processing unit
108 Service information processing unit
109 Presentation processing unit
110 FontObject recording memory
111 Font processing unit
112 Graphics plane
113 Video plane
114 Synthesis processing unit
301 Transmitting apparatus
302 Receiving apparatus A
303 Receiving apparatus B
304 Receiving apparatus C
305 Transmission path
601 TS signal
602 TS processing unit
603 File system recording memory
604 Service information recording memory
605 AV recording memory
606 Link switch unit
607 FontObject generation unit
608 Program processing unit
609 Service information processing unit
610 Service switch detection unit
611 Presentation processing unit
612 Font rendering unit
613 FontObject recording memory
614 Graphics plane
615 Video plane
616 Synthesis processing unit
617 Font identifier recording memory
1401 Information recording medium
1402 Reading unit

BEST MODE FOR CARRYING OUT THE INVENTION

The following describes embodiments of the present invention with reference to the drawings.

First Embodiment

First, a first embodiment of the present invention will be described.

Figure 4:
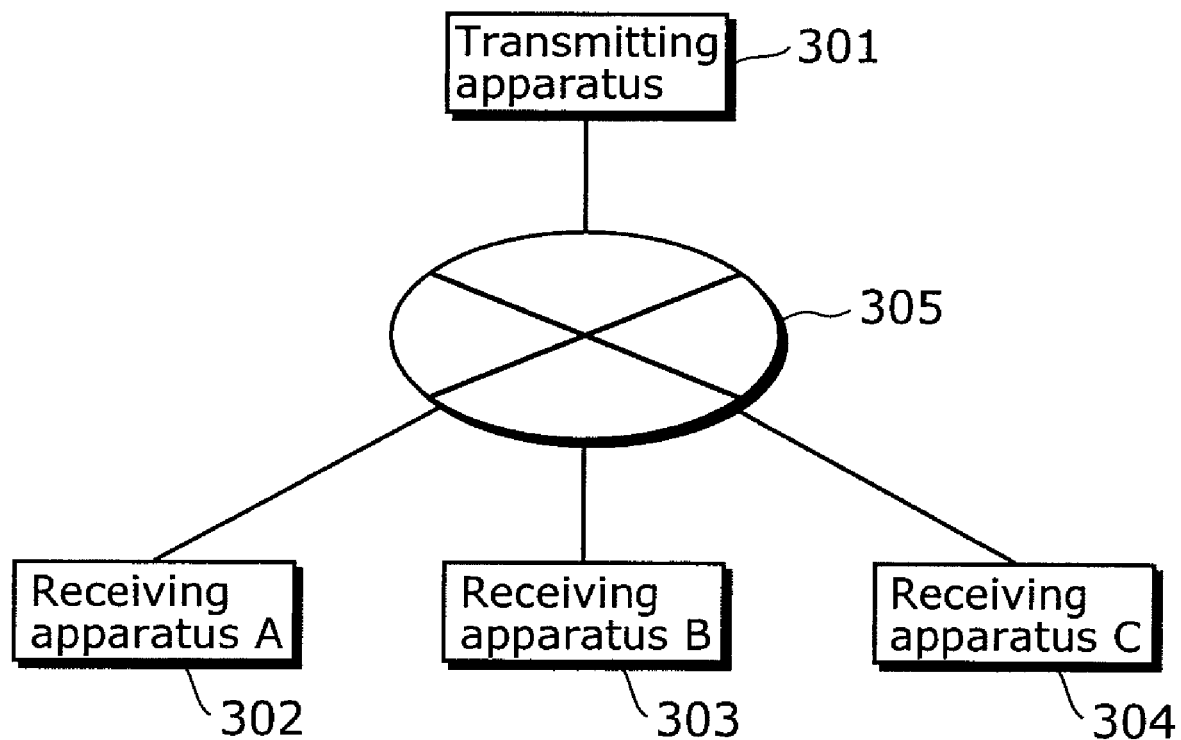
FIG. 4 is a line block diagram of a digital broadcast system.

FIG. 4 is a diagram showing a structure of a digital broadcast system according to the first embodiment of the present invention. The digital broadcast system includes a transmitting apparatus 301, three receiving apparatuses A302, B303, and C304, and a transmission path 305. Although three receiving apparatuses are connected to one transmitting apparatus in the present embodiment, the predetermined number of receiving apparatuses may be connected to one transmitting apparatus.

<Architecture of MPEG Transport Stream>

Figure 5:
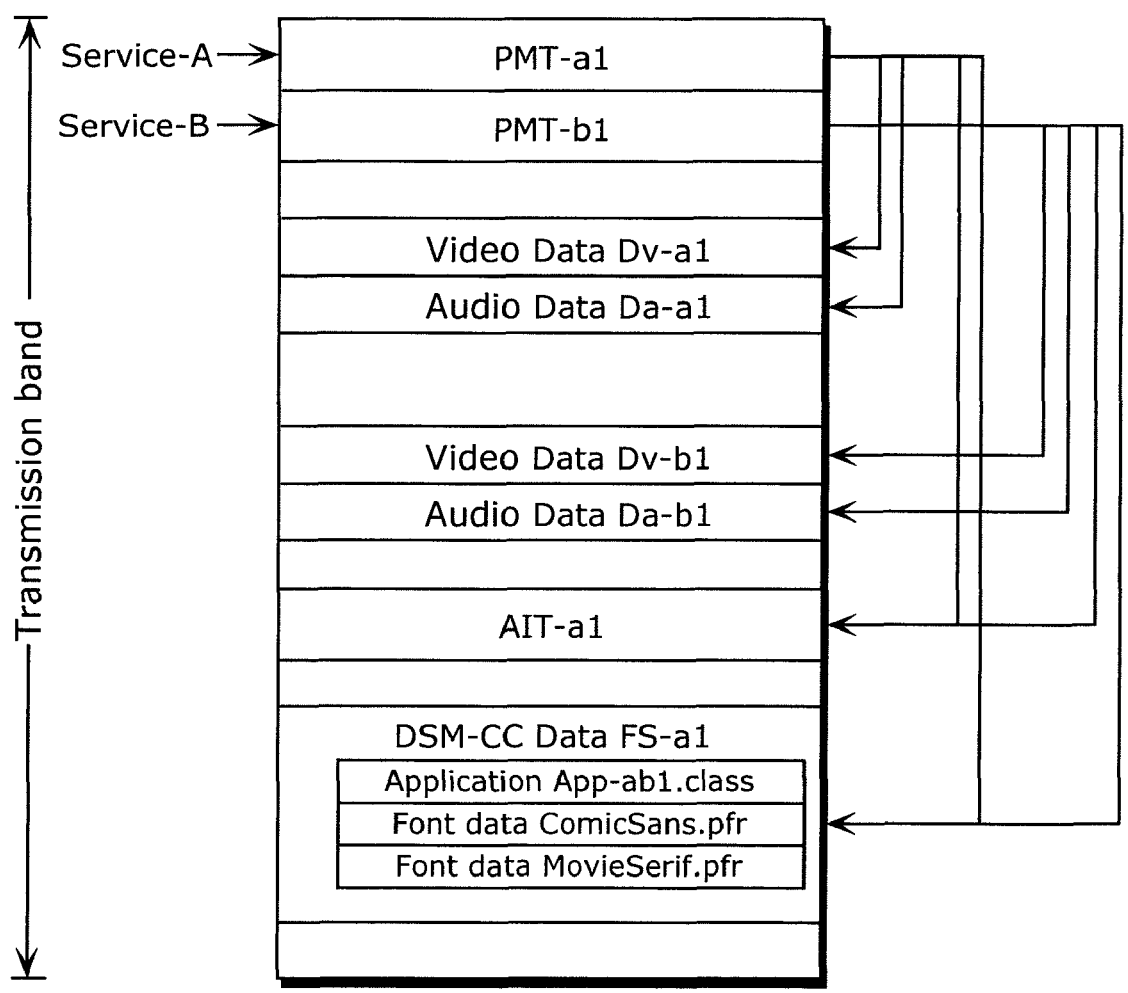
FIG. 5 is a view showing a frame format of an MPEG transport stream.

The transmitting apparatus 301 transmits, to plural receiving apparatuses, an MPEG transport stream as a broadcast signal for video, audio, data, and so on. FIG. 5 is a view showing a frame format of the MPEG transport stream transmitted by the transmitting apparatus 301. The MPEG transport stream includes two DVB services, Service-A and Service-B. The view showing the frame format is identical to a view showing a frame format of an MPEG transport stream in the DVB-MHP standard. The Service-A is represented by PMT-a1. The PMT-a1 designates, as components of the Service-A, Video Data Dv-a1, Audio Data Da-a1, and DSM-CC Data FS-a1. The DSM-CC Data FS-a1 is data for structuring a file system of DSM-CC. Here, the DSM-CC Data FS-a1 includes an application program App-ab1.class expressed in the Java™ bytecode, font data ComicSans.pfr, and font data MovieSerif.pfr. The Service-B is represented by PMT-b1. The PMT-b1 designates, as components of the Service-B, Video Data Dv-b1, Audio Data Dv-b1, and DSM-CC Data FS-a1. The DSM-CC Data FS-a1 is the data for structuring the file system of the DSM-CC. Here, the AIT-a1 is common to both the Service-A and the Service-B.

Figure 6:
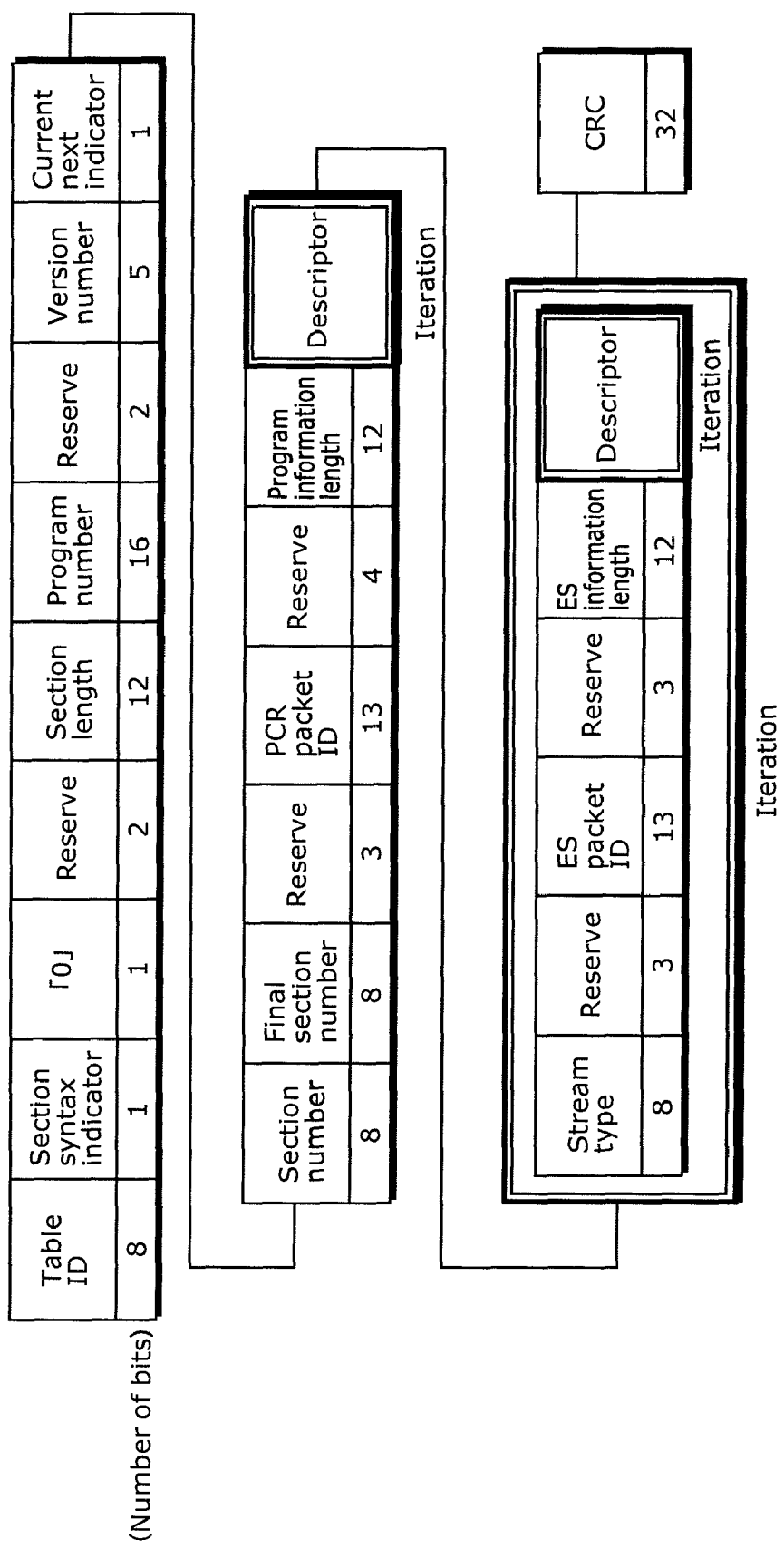
FIG. 6 is a diagram showing a data structure of a PMT.

FIG. 6 is a diagram showing a data structure of a PMT according to the present invention.

Program information is described in a Program Map Table (PMT). A packet ID of the PMT is denoted by PAT, and a table ID is 0x02. A packet ID of an Elementary Stream (ES) which transmits video, audio, application, other addition data, and so on making up a program, and the like, are described in the PMT on a program-by-program basis. A version number is added every time a content of the table is updated. A current next indicator is used for identification in transmitting a current version and next version simultaneously. In the case where a font identifier is included in the PMT, the font identifier is described as a Descriptor. The structure of and a method for obtaining the PMT are well known to a person with an ordinary skill in the art.

Figure 7:
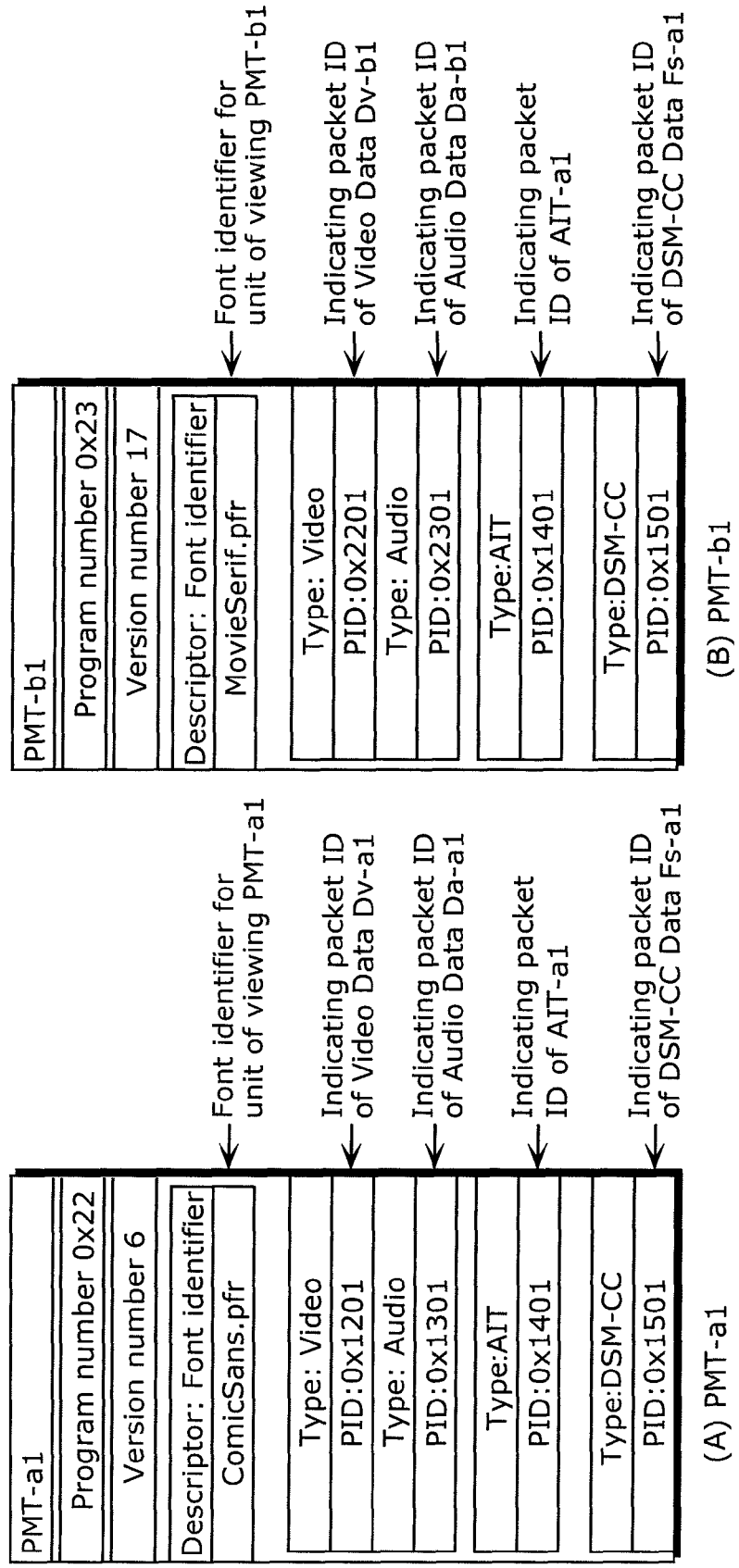
FIGS. 7(A) and (B) is a view showing a frame format of a data structure of a PMT.

FIG. 7 is a diagram showing a data structure of a PMT according to the present invention.

As shown in FIG. 7(A), the version number "6" and a font identifier "ComicSans.pfr" are included in PMT-a1. The font identifier "ComicSans.pfr" is information for identifying font data to be used during reproduction of PMT-a1. Additionally, packet IDs of Video Data Dv-a1, Audio Data Da-a1, AIT-a1, and DSM-CC Data FS-a1 which are the components are included.

Similarly, as shown in FIG. 7(B), the version number "17" and a font identifier "MovieSerif.pfr" are included in PMT-b1. The font identifier "MovieSerif.pfr" is information for identifying font data to be used during reproduction of the PMT-b1. Additionally, packet IDs of Video Data Dv-b1, Audio Data Da-b1, AIT-a1, and DSM-CC Data FS-a1 which are the components are included.

Figure 8:
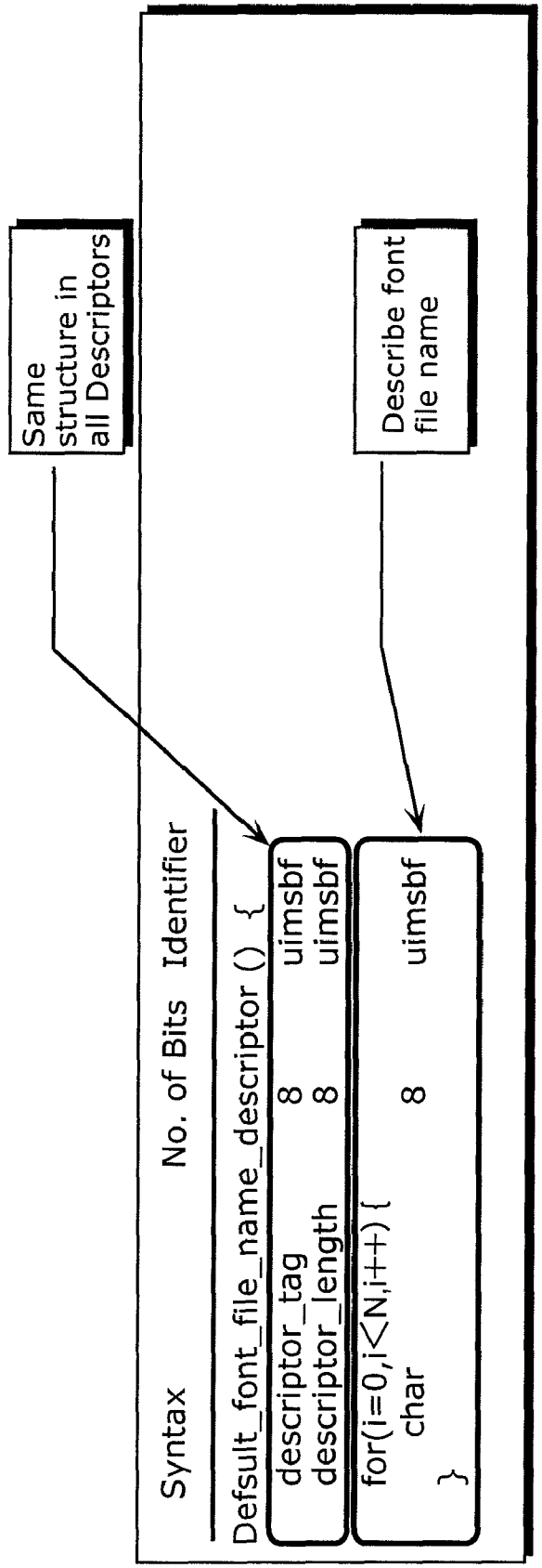
FIG. 8 is a diagram showing an example of a Descriptor of a font identifier.

FIG. 8 is a diagram showing an example of a Descriptor of a font identifier.

Here, a Descriptor which describes a font file name will be exemplified. The Descriptor used in digital broadcasting has been described in, for example, "Digital Video Broadcasting (DVB): Specification for Service Information (SI) in DVB systems" (EN 300 468) and the like, and is well known to a person with an ordinary skill in the art. As a basic rule, descriptor_tag and descriptor_length are arranged for the first two. A value assigned on a Descriptor-by-Descriptor basis is described in descriptor_tag. The number of bytes of the Descriptor is described in descriptor_length. Due to the basic rule, when a receiving apparatus encounters an unknown Descriptor, it becomes possible to spare processing of the Descriptor and to start processing of next Descriptor. Although an eight-bit value, for example, such as 0x80, is given to descriptor_tag of the Descriptor of the font identifier, when a value is not used as descriptor_tag of other Descriptor to be used in the broadcast system, it may be other eight-bit value.

<Structure of Receiving Apparatus>

Figure 9:
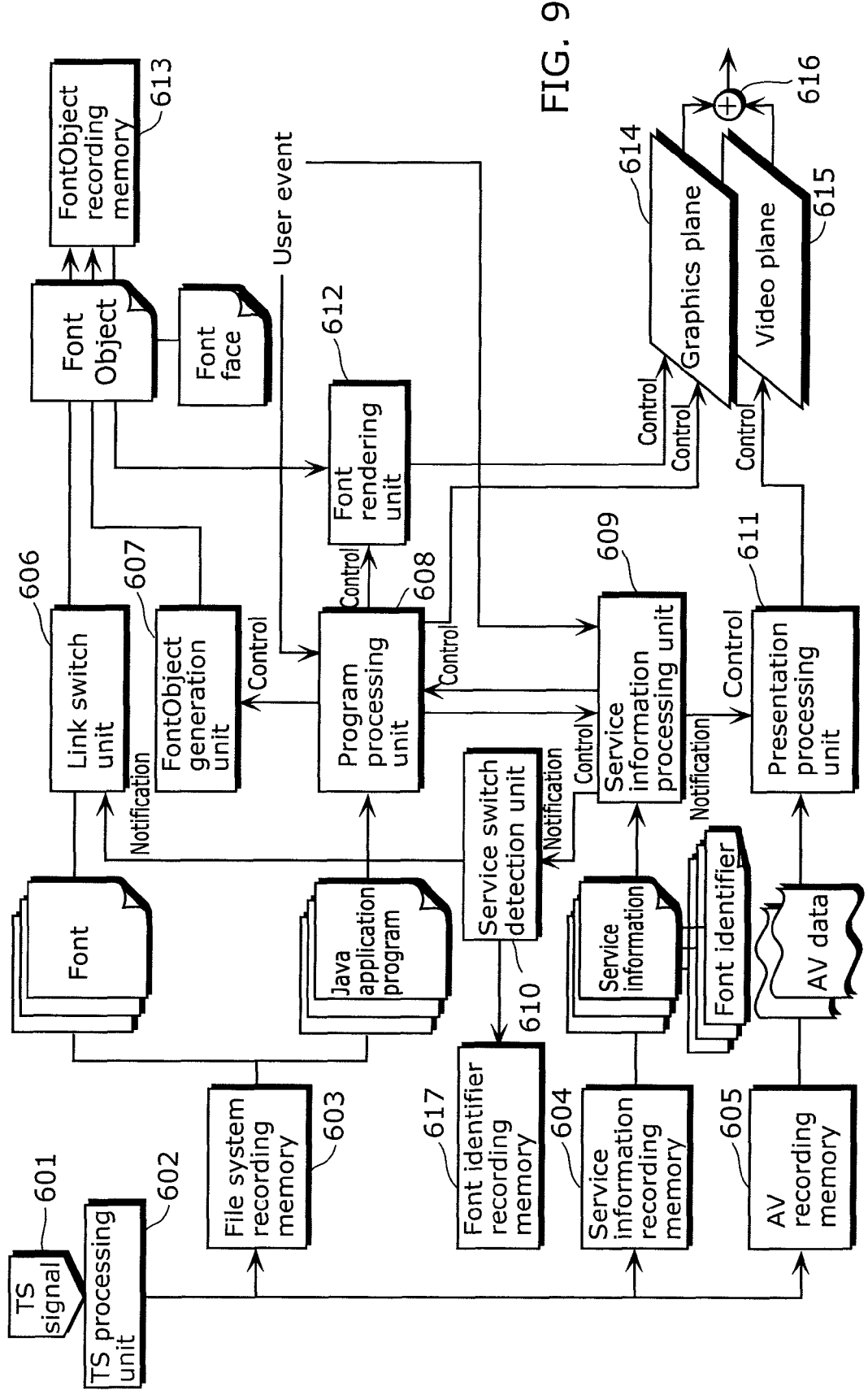
FIG. 9 is a block diagram of a receiving apparatus according to a first embodiment.

FIG. 9 is a block diagram showing a general functional structure of a receiving apparatus according to the first embodiment.

The receiving apparatus receives the MPEG transport stream transmitted from the transmitting apparatus 301 and executes an application program included in the MPEG transport stream.

A TS processing unit 602 is equivalent to a receiving unit according to the present invention. That is to say, the TS processing unit 602 decodes data on a TS signal 601. Each piece of the decoded data is recorded in respective dedicated memories based on a type of the each piece of data. Font data and an application program are recorded in a file system recording memory 603, service information such as a PMT is recorded in a service information recording memory 604, and AV data such as video and audio is recorded in an AV recording memory 605, respectively. The application program is an application program expressed in the Java™ bytecode (the rest is the same).

A service information processing unit 609 is equivalent to an extraction unit according to the present invention. That is to say, the service information processing unit 609 processes the service information recorded in the service information recording memory 604, instructs a presentation processing unit 611 to reproduce (output) the AV data and a program processing unit 608 to start the application program, extracts a font identifier from the service information, and notifies a service switch detection unit 610 of the extracted font identifier.

General operation performed by the TS processing unit 602 is same as before. Furthermore, information for specifying service information to be processed by the service information processing unit 609 (specifically, an MPEG program number and the like) is same as before. Moreover, a unit for giving (specifically, a remotely-controlled input unit for inputting an instruction from a remote controller, and the like), to the service information processing unit 609, the information for specifying the service information to be processed is same as before.

The presentation processing unit 611 is equivalent to an output unit according to the present invention. That is to say, the presentation processing unit 611 has decoders corresponding to video, audio, and caption respectively, and decodes the AV data recorded in the AV recording memory 605 and outputs the decoded AV data to a video plane 615 under the instruction of the service information processing unit 609.

The program processing unit 608 is equivalent to an execution unit according to the present invention. That is to say, the program processing unit 608 includes the Java™ virtual machine, and executes the application program recorded in the file system recording memory 603. In order to render a character string using font data identified by a font identifier included in service information, a bytecode for instructing to generate a FontObject that is compatible with java.awt.Font of AWT and a bytecode for instructing to render the character string using the FontObject are included in the application program. Hereinafter, there is a case where a FontObject generated by an application program (FontObject generated by a function of the application program) is referred to as a "virtual FontObject". The virtual FontObject is an insubstantial FontObject and, specifically, a FontObject in which a font face to be used for rendering is not read onto a memory. When a service in currently reproduction is switched, a font file corresponding to the service is connected to the virtual FontObject. This point will be described later.

The program processing unit 608 reads, from the application program, the bytecode for instructing to generate the FontObject, instructs a FontObject generation unit 607 to generate the FontObject, and receives the resulting FontObject from the FontObject generation unit 607. Further, the program processing unit 608 reads, from the application program, the bytecode for instructing to render the character string, and instructs a font rendering unit 612 to render the FontObject.

A service switch detection unit 610 is equivalent to a switch detection unit according to the present invention. That is to say, when receiving the notification of the font identifier from the service information processing unit 609, the service switch detection unit 610 compares a font identifier recorded in a font identifier recording memory 617 and the font identifier received from the service information processing unit 609. As the result of comparison, when the two font identifiers are identical, the service switch detection unit 610 performs nothing. As the result of comparison, when the two font identifiers are different, the service switch detection unit 610 stores the font identifier received from the service information processing unit 609 in the font identifier recording memory 617 and notifies a link switch unit 606 of the font identifier.

The link switch unit 606 is equivalent to a connection unit according to the present invention. That is to say, when receiving the notification of the font identifier from the service switch detection unit 610, the link switch unit 606 obtains font data identified by the font identifier from the file system recording memory 603. Then, a font face which is rendering information of the FontObject is generated and recorded in a FontObject recording memory 613.

The FontObject recording memory 613 makes a pair of the FontObject generated by the FontObject generation unit 607 and the font face generated by the link switch unit 606, and stores the pair. In the FontObject recording memory 613, at least an area in which the FontObject is recorded is a heap area of the Java™ virtual machine.

As stated above, when receiving the notification of the font identifier from the service switch detection unit 610, the link switch unit 606 connects the font data identified by the font identifier to the virtual FontObject. Accordingly, the font data identified by the font identifier will be used by the application program.

When receiving the instruction to generate a FontObject from the program processing unit 608, the FontObject generation unit 607 generates a FontObject that is compatible with java.awt.Font of AWT and records the generated FontObject in the FontObject recording memory 613. It should be noted that java.awt.Font compatibility indicates that a method defined by java.awt.Font can be used also in a FontObject and that the FontObject can be given to argument in a method in which an instance of a java.awt.Font can be given to the argument.

The font rendering unit 612 is equivalent to a rendering unit according to the present invention. That is to say, when receiving the instruction to render a FontObject from the program processing unit 608, the font rendering unit 612 obtains a font face paired with the FontObject from the FontObject recording memory 613, rasterizes the obtained font face, and outputs the rasterized font face to a graphics place 614.

The graphics plane 614 and the video plane 615 are synthesized by a synthesis processing unit 616 and outputted to a TV receiver and the like.

Functions of the program processing unit 608 which executes the application program, the font rendering unit 612 which rasterizes the font face, the graphics plane 614, the video plane 615, and the synthesis processing unit 616 are the conventional generic functions and well known to a person with an ordinary skill in the art.

<Operation of Receiving Apparatus>

The following describes operation for switching font data to be used for each unit of viewing performed by the receiving apparatus as structured above with reference to flow charts shown in FIGS. 10 to 14. The operation is typical operation in the present embodiment.

Figure 10:
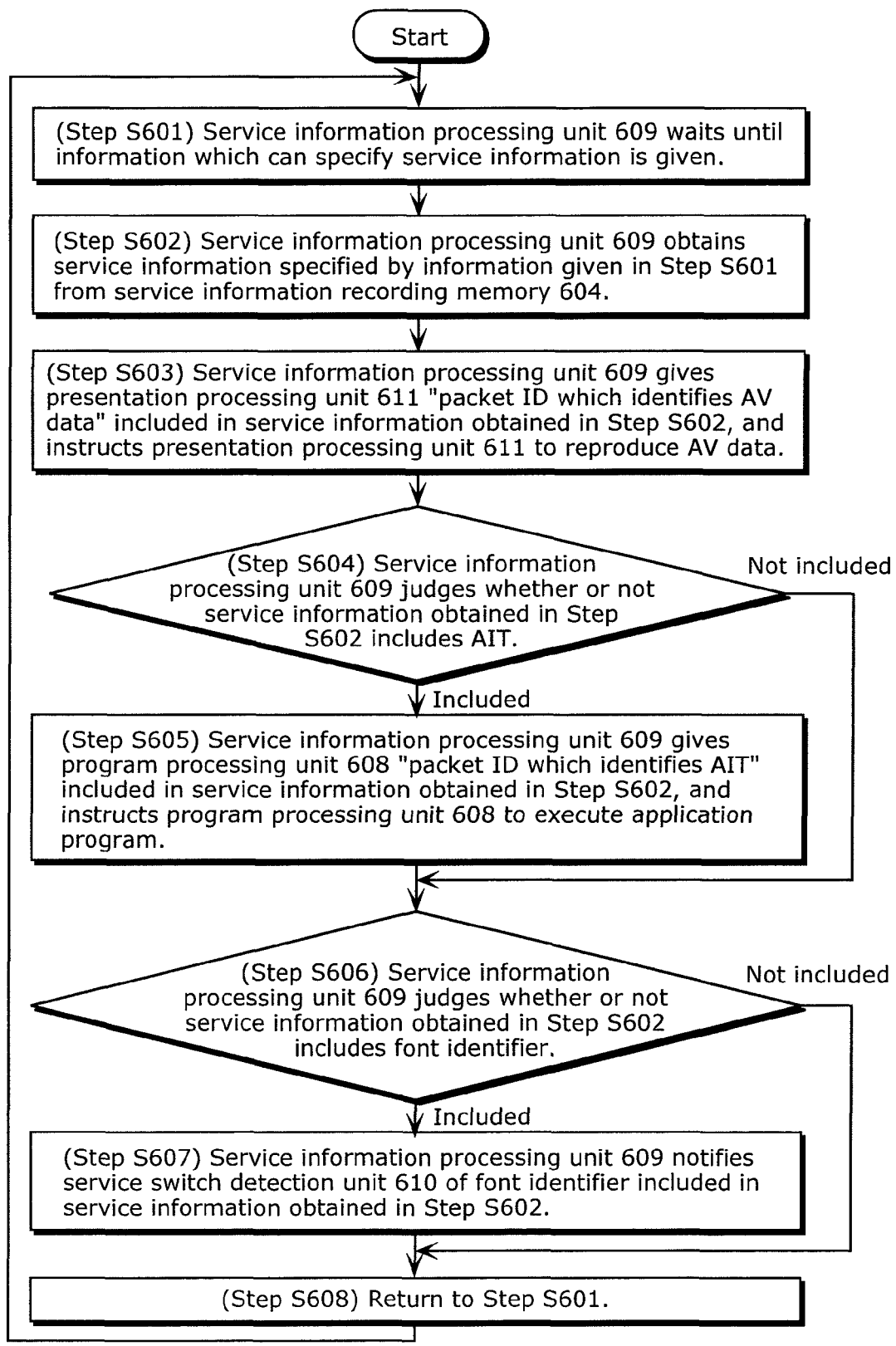
FIG. 10 is a flow chart at a time of service reproduction.

FIG. 10 is a flow chart of operation performed by the service information processing unit 609 at a time of service reproduction.

(Step S601) The service information processing unit 609 waits until information which can specify service information is given.

(Step S602) The service information processing unit 609 obtains the service information specified by the information given in Step S601 from the service information recording memory 604.

(Step S603) The service information processing unit 609 gives the presentation processing unit 611 "a packet ID which identifies AV data" included in the service information obtained in Step S602, and instructs the presentation processing unit 611 to reproduce the AV data.

(Step S604) The service information processing unit 609 judges whether or not the service information obtained in Step S602 includes AIT. In the case where the AIT is included, a process proceeds to Step S605; and in the case where the AIT is not included, the process proceeds to Step S606.

(Step S605) The service information processing unit 609 gives the program processing unit 608 "a packet ID which identifies AIT" included in the service information obtained in Step S602, and instructs the program processing unit 608 to execute an application program.

(Step S606) The service information processing unit 609 judges whether or not the service information obtained in Step S602 includes a font identifier. In the case where the font identifier is included, a process proceeds to Step S607; and in the case where the font identifier is not included, the process proceeds to Step S607.

(Step S607) The service information processing unit 609 notifies the service switch detection unit 610 of the font identifier included in the service information obtained in Step S602.

(Step S608) Return to Step S601.

Figure 11:
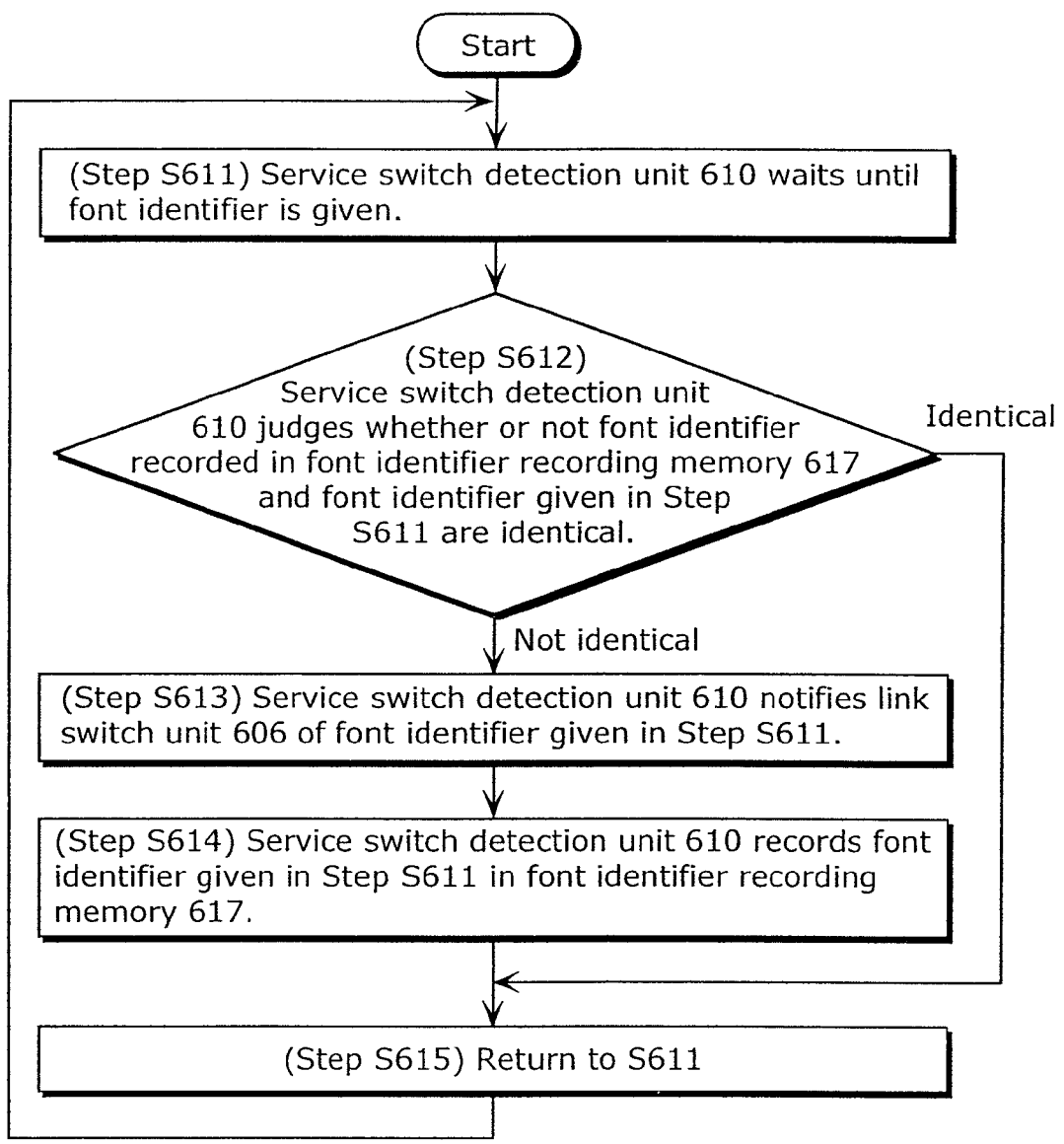
FIG. 11 is a flow chart at a time of service switch detection.

FIG. 11 is a flow chart of operation performed by the service switch detection unit 610 at a time of service switch detection.

(Step S611) The service switch detection unit 610 waits until a font identifier is given.

(Step S612) The service switch detection unit 610 judges whether or not a font identifier recorded in the font identifier recording memory 617 and the font identifier given in Step S611 are identical. In the case where the two identifiers are identical, a process proceeds to Step S615; and in the case where they are not identical, the process proceeds to Step S613.

(Step S613) The service switch detection unit 610 notifies the link switch unit 606 of the font identifier given in Step S611.

(Step S614) The service switch detection unit 610 records the font identifier given in Step S611 in the font identifier recording memory 617.

(Step S615) Return to Step S611.

Figure 12:
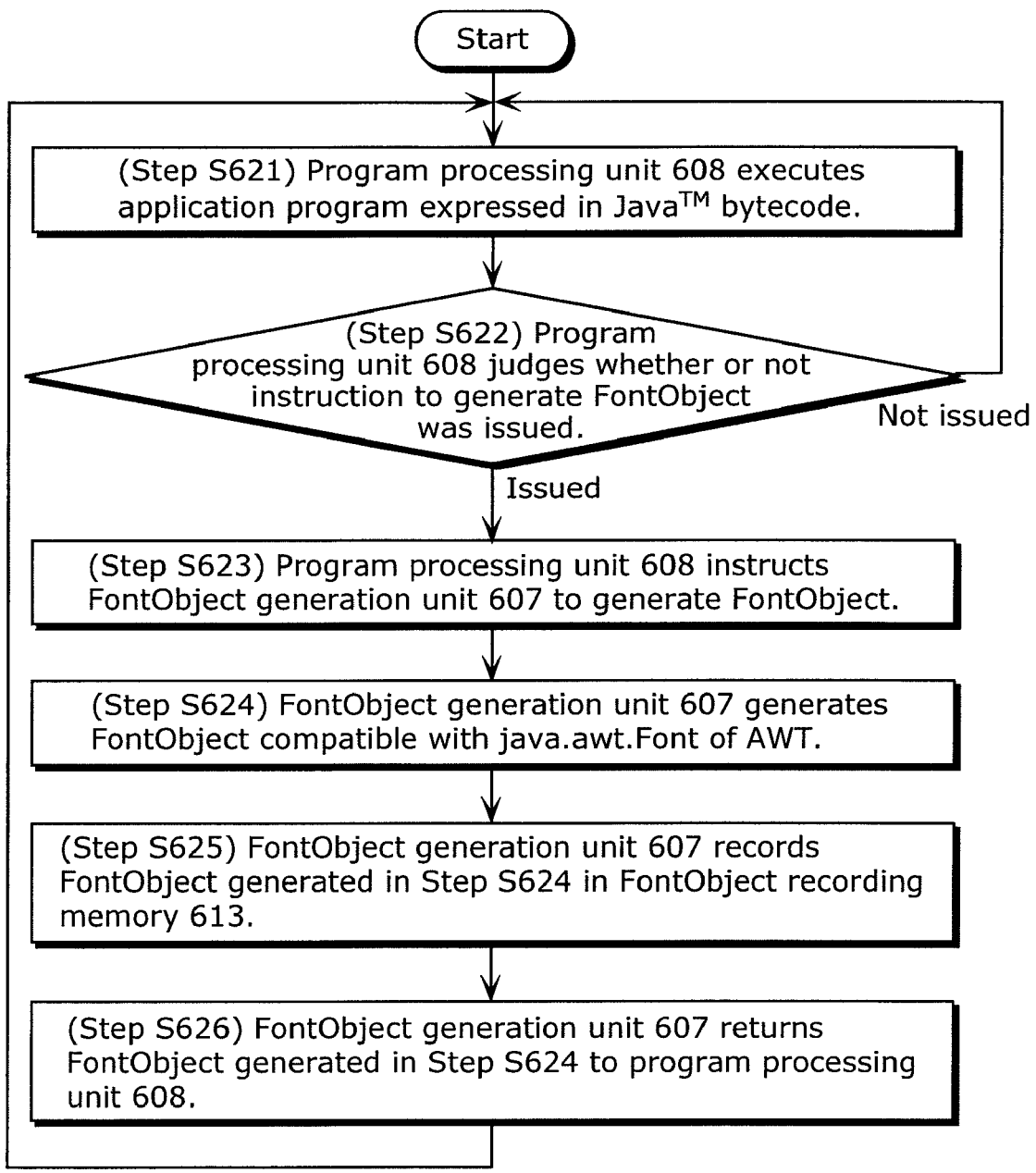
FIG. 12 is a flow chart at a time of FontObject generation.

FIG. 12 is a flow chart of operation performed by the FontObject generation unit 607 and the program processing unit 608 at a time of FontObject generation.

(Step S621) The program processing unit 608 executes an application program.

(Step S622) The program processing unit 608 judges whether or not an instruction to generate a FontObject was issued. In the case where the instruction to generate the FontObject was issued, a process proceeds to Step S623; and in the case where the instruction was not issued, the process returns to Step S621.

(Step S623) The program processing unit 608 instructs the FontObject generation unit 607 to generate a FontObject.

(Step S624) The FontObject generation unit 607 generates a FontObject compatible with java.awt.Font of AWT. Put it differently, a virtual FontObject which is an insubstantial FontObject is generated. As already described, a font face to be used for rendering has not been read onto a memory in this step. A preparation for font data to be connected to the virtual FontObject is made only.

(Step S625) The FontObject generation unit 607 records the FontObject generated in Step S624 in the FontObject recording memory 613.

(Step S626) The FontObject generation unit 607 returns the FontObject generated in Step S624 to the program processing unit 608.

Figure 13:
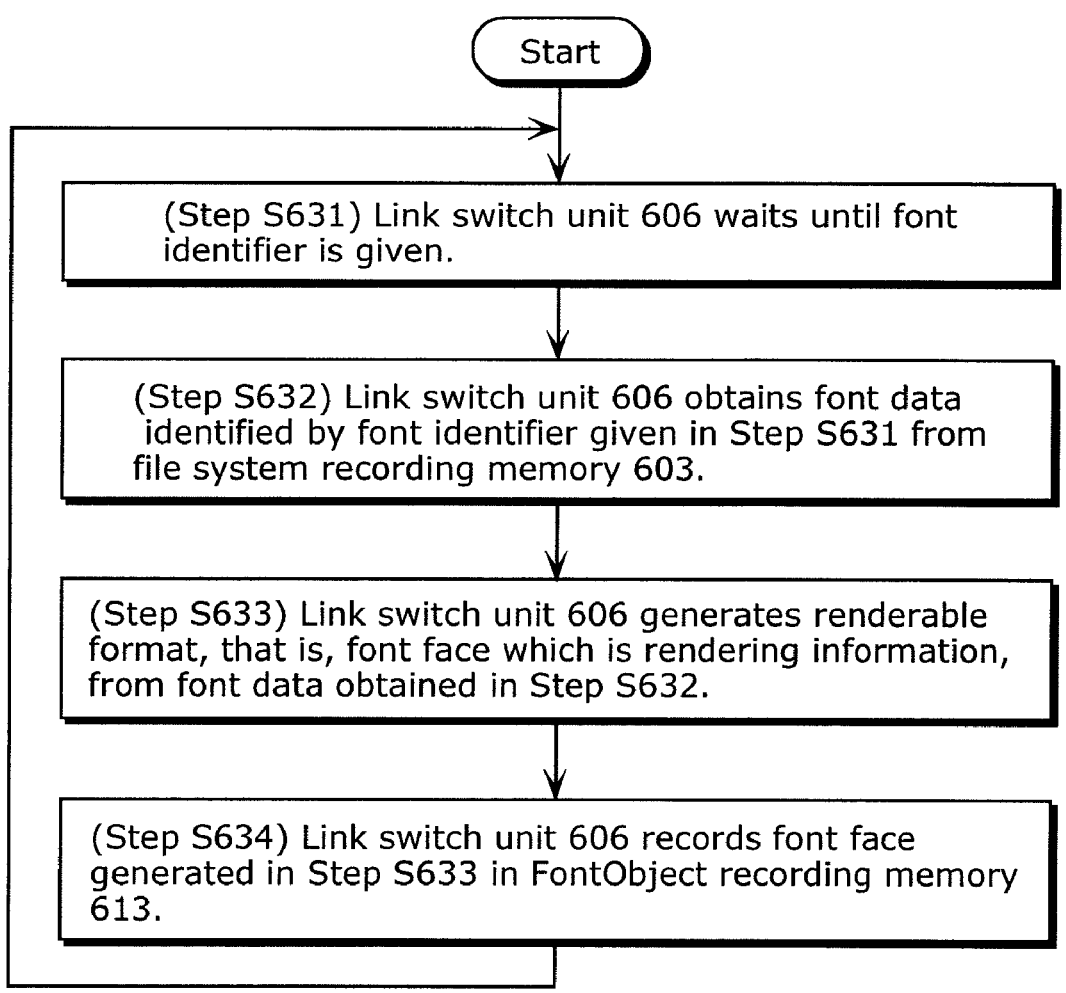
FIG. 13 is a flow chart at a time of font face generation.

FIG. 13 is a flow chart of operation performed by the link switch unit 606 at a time of font face generation.

(Step S631) The link switch unit 606 waits until a font identifier is given.

(Step S632) The link switch unit 606 obtains font data identified by the font identifier given in Step S631 from the file system recording memory 603.

(Step S633) The link switch unit 606 generates a renderable format, that is, a font face which is rendering information, from the font data obtained in Step S632.

(Step S634) The link switch unit 606 records the font face generated in Step S633 in the FontObject recording memory 613. Accordingly, the font data identified by the font identifier comes to be connected to the virtual FontObject. That is to say, the font face to be used for rendering comes to be read onto the memory.

Figure 14:
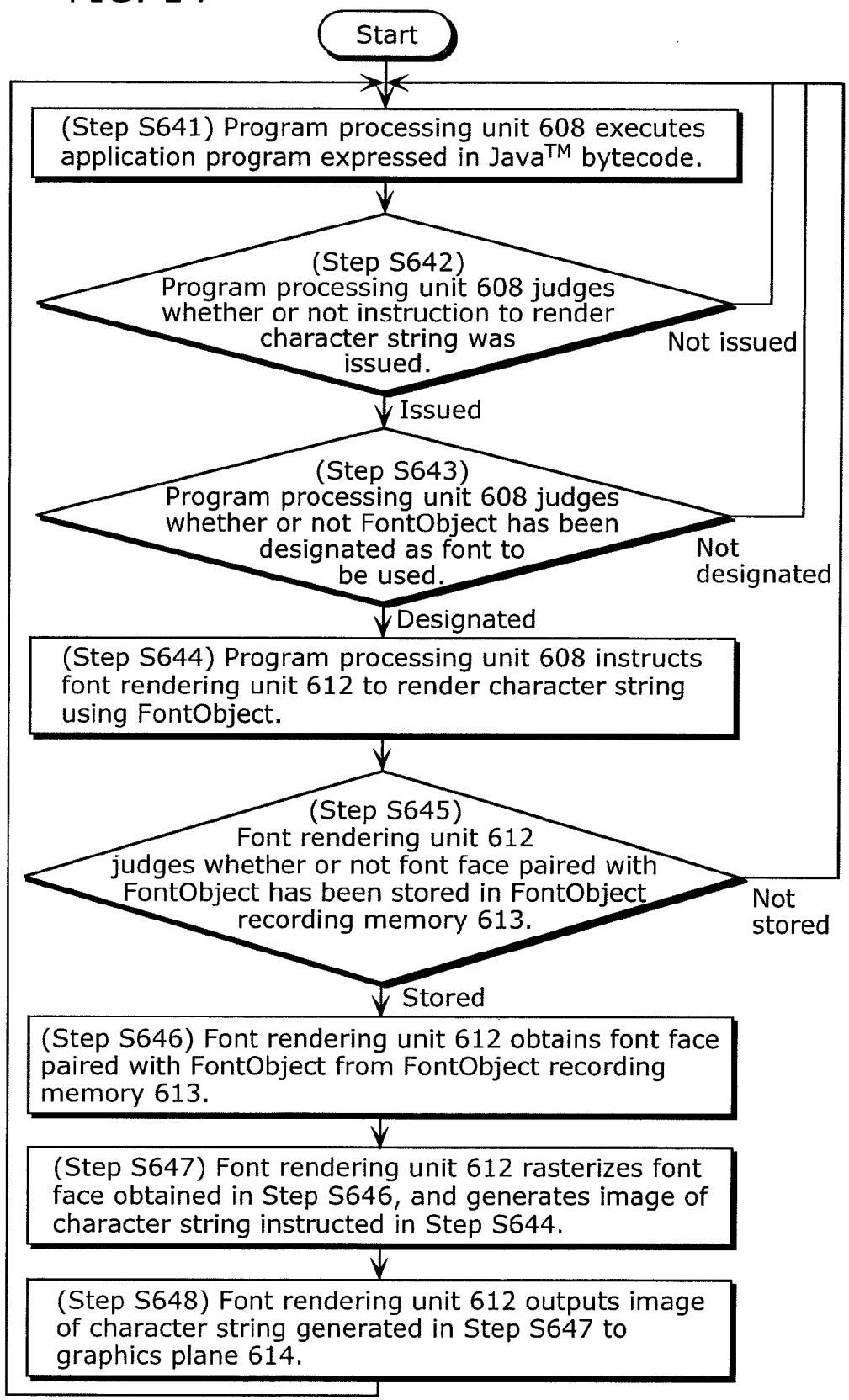
FIG. 14 is a flow chart at a time of character and character string rendering.
Figure 15:
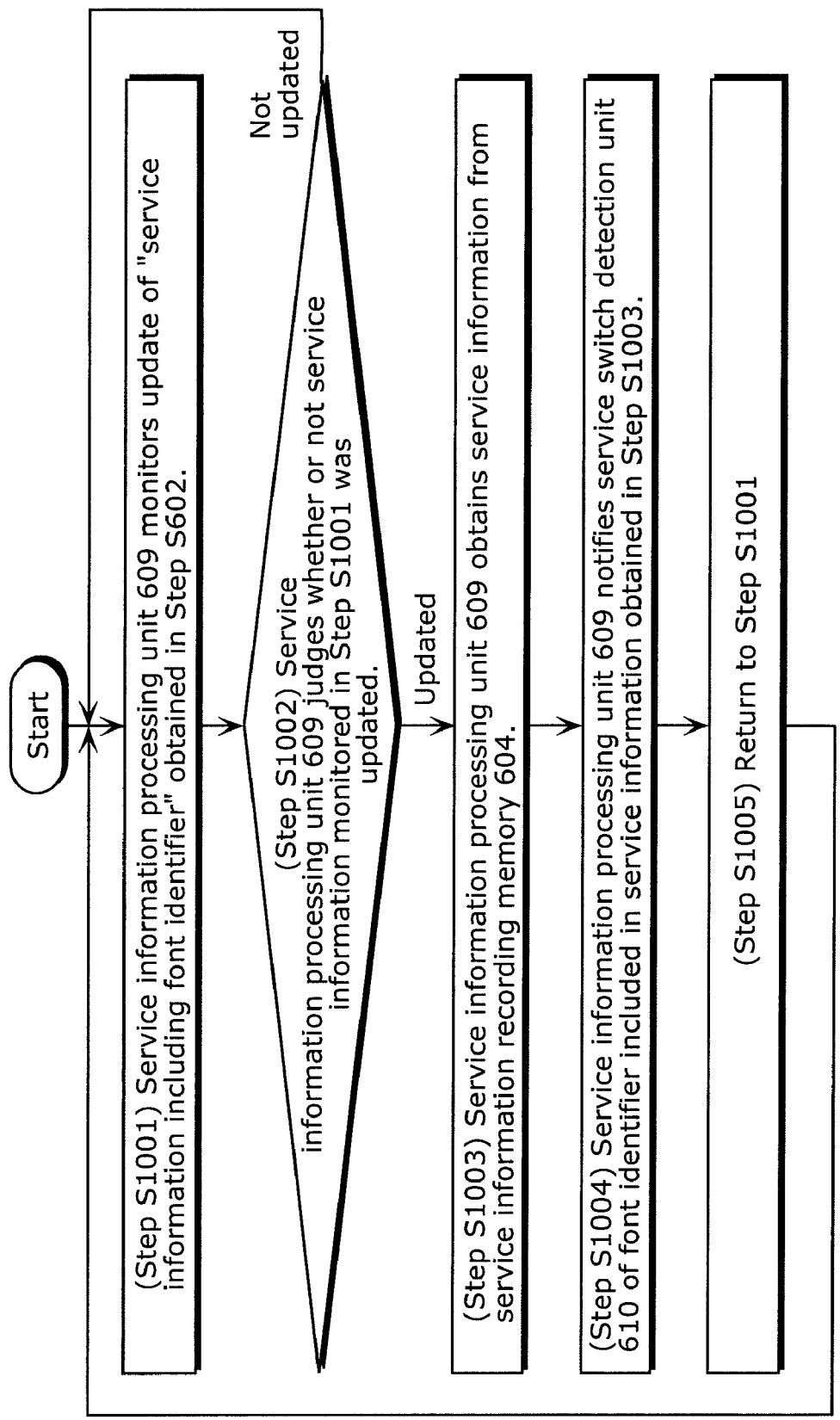
FIG. 15 is a flow chart at a time of upgrading a PMT.

FIG. 14 is a flow chart of operation performed by the program processing unit 608 and the font rendering unit 612 at a time of character or character string rendering.

(Step S641) The program processing unit 608 executes an application program.

(Step S642) The program processing unit 608 judges whether or not an instruction to render a character string was issued. In the case where the instruction to render the character string was issued, a process proceeds to Step S643; and in the case where the instruction was not issued, the process returns to Step S641.

(Step S643) The program processing unit 608 judges whether or not a FontObject has been designated as a font to be used. In the case where the FontObject has been designated, a process proceeds to Step S644; and in the case where the FontObject has not been designated, the process returns to Step S641.
(Step S644) The program processing unit 608 instructs the font rendering unit 612 to render the character string using the FontObject.
(Step S645) The font rendering unit 612 judges where or not a font face paired with the FontObject has been stored in the FontObject recording memory 613. In the case where the font face has been stored, a process proceeds to Step S646; and in the case where the font face has not been stored, the process returns to Step S641.
(Step S646) The font rendering unit 612 obtains the font face paired with the FontObject from the FontObject recording memory 613.
(Step S647) The font rendering unit 612 rasterizes the font face obtained in Step S646, and generates an image of the character string instructed in Step S644.
(Step S648) The font rendering unit 612 outputs the image of the character string generated in Step S647 to the graphics plane 614.

By the way, a PMT in which a font identifier is set is channel-by-channel data. Thus, in the case where a font identifier is changed depending on a program, it is required to process upgraded data of the PMT. The following describes a method for processing the upgraded data of the PMT.

FIG. 10 is a flow chart of operation performed by the service information processing unit 609 at a time of upgrading the PMT.
(Step S1001) The service information processing unit 609 monitors an update of "the service information including the font identifier" obtained in Step S602.
(Step S1002) The service information processing unit 609 judges whether or not the service information monitored in Step S1001 was updated. In the case where the service information was updated, a process proceeds to Step S1003; and in the case where the service information was not updated, the process returns to Step S1001.
(Step S1003) The service information processing unit 609 obtains the service information from the service information recording memory 604.
(Step S1004) The service information processing unit 609 notifies the service switch detection unit 610 of a font identifier included in the service information obtained in Step S1003.
(Step S1005) Return to Step S1001.

Next, a specific example of the above-mentioned operation will be described.

The MPEG transport stream shown in FIG. 5 is given as the TS signal 601. The MPEG transport stream includes: PMT-a1 which is a table for identifying a unit of viewing; PMT-b1 which is also a table for identifying a unit of viewing; Video Data Dv-a1; Audio Data Da-a1; Video Data Dv-b1; Audio Data Da-b1; AIT-a1 in which information for starting an application program is recorded; and a File System DSM-CC Data FS-a1.

As shown in FIG. 7(A), the PMT-a1 includes respective packet IDs of the Video Data DV-a1, the Audio Data Da-a1, the AIT-a1, and the File System DSM-CC Data FS-a1, and a font identifier "ComicSans.pfr". The packet ID of the Video Data DV-a1 is information which can specify AV data and an application program. The font data identifier "ComicSans.pfr" is information for identifying font data included in the File System DSM-CC Data FS-a1.

As shown in FIG. 7(B), the PMT-b1 includes respective packet IDs of the Video Data DV-b1, the Audio Data Da-b1, the AIT-a1, and the File System DSM-CC Data FS-a1, and a font identifier "MovieSerif.pfr". The packet ID of the Video Data DV-b1 is information which can specify AV data and an application program. The font identifier "MovieSerif.pfr" is information for identifying font data included in the File System DSM-CC Data FS-a1.

Figure 16:
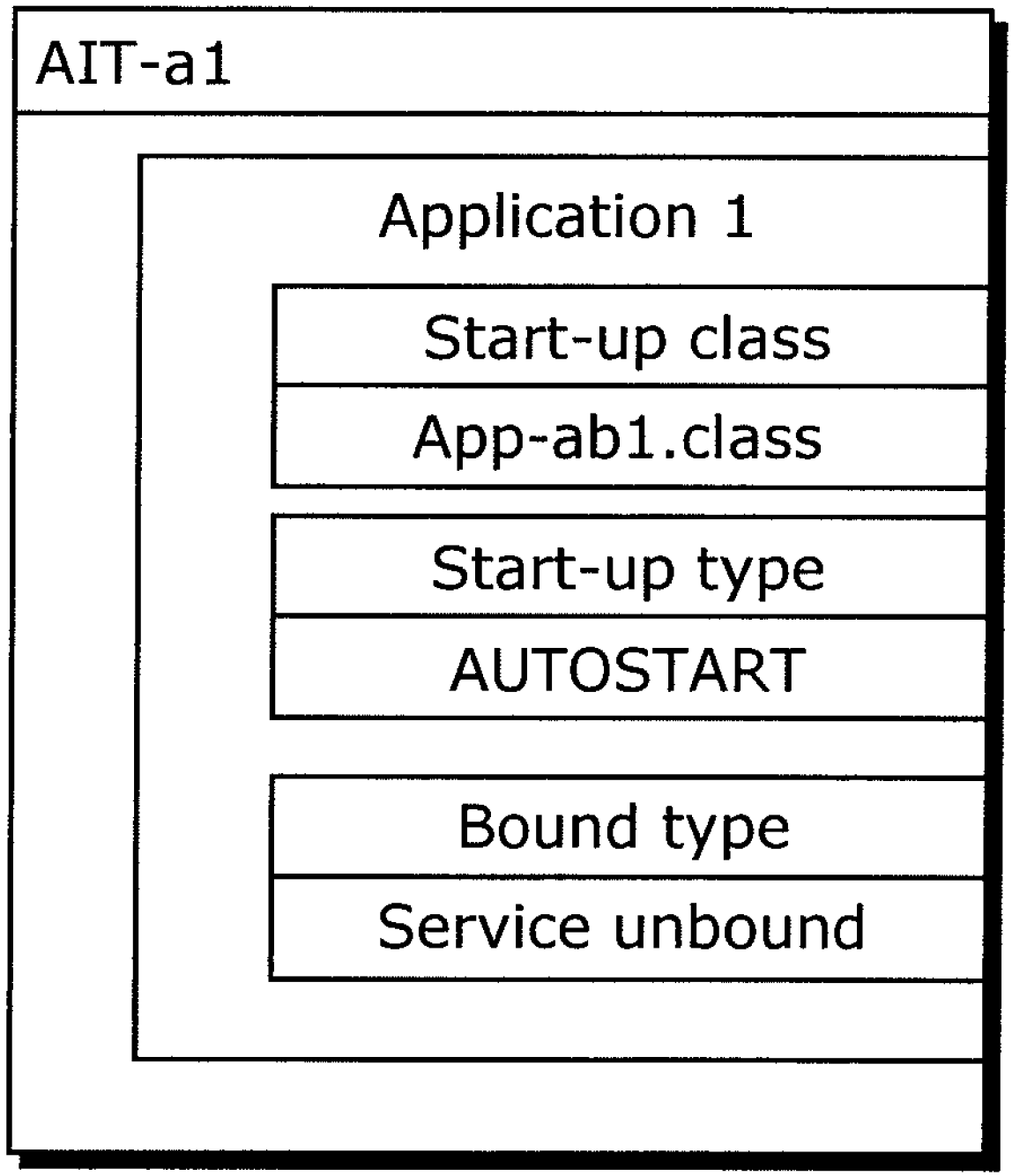
FIG. 16 is a conceptual diagram showing a data structure of AIT-a1.

FIG. 16 is view showing a frame format of a data structure of the AIT-a1. As shown in this figure, a piece of application information is stored in the AIT-a1, and a start-up class, a start-up type, and a bound type of the stored application information are "App-ab1.class", "AUTOSTART", and "service unbound", respectively.

Here, a file App-ab1.class which is an application program, a file ComicSans.pfr which is font data, and a file MovieSerif.pfr which is font data, are stored in the File System DSM-CC Data FS-a1.

The TS processing unit 602 decodes the MPEG transport stream. Each piece of the decoded data is recorded in respective dedicated memories based on a type of the each piece of data. The file App-ab1.class, the file ComicSans.pfr, and the file MovieSerif.pfr are stored in the file system recording memory 603. The PMT-a1, the PMT-b1, and the AIT-a1 are recorded in the service information recording memory 604. The Video Data DV-a1, the Video Data DV-b1, the Audio Data Da-a1, and the Audio Data Da-b1 are recorded in the AV recording memory 605.

An instruction to process the PMT-a1 for viewing is given to the service information processing unit 609. As an initial condition, the font identifier recording memory 617 stores a null character string as a font identifier. The Java™ bytecode is stored in a file App-ab1.class which is an application program. The bytecode is a compilation of a source code (refer to FIG. 17) created in accordance with the DVB-MHP standard.

First, operation at a time of selecting the PMT-a1 as a unit of viewing will be described.

The service information processing unit 609 obtains the PMT-a1 from the service information recording memory 604. The service information processing unit 609 gives the presentation processing unit 611 respective packet IDs of Video Data DV-a1 and Audio Data Da-a1 included in the PMT-a1, and instructs the presentation processing unit 611 to reproduce AV data. The service information processing unit 609 judges that a packet ID of the AIT-a1 is included in the PMT-a1. The service information processing unit 609 obtains the AIT-a1 from the service information recording memory 604. The service information processing unit 609 gives the program processing unit 608 the AIT-a1, and instructs the program processing unit 608 to run an application program. The service information processing unit 609 judges that a font identifier "ComicSans.pfr" is included in the PMT-a1, and notifies the service switch detection unit 610 of the font identifier "ComicSans.pfr".

The service switch detection unit 610 receives the notification of the font identifier "ComicSans.pfr" from the service information processing unit 609. The service switch detection unit 610 judges that the null character string recorded in the font identifier recording memory 617 and the font identifier "ComicSans.pfr" are not identical, notifies the link switch unit 606 of the font identifier "ComicSans.pfr", and records the font identifier "ComicSans.pfr" in the font identifier recording memory 617.

The service information processing unit 609 gives the program processing unit 608 the AIT-a1, and instructs the program processing unit 608 to run the application program. Since the start-up type of the application information stored in the AIT-a1 is "AUTOSTART", the program processing unit 608 obtains a file "App-ab1.class" in which the Java™ bytecode is stored from the file system recording memory 603, and executes the obtained file. When a bytecode generated by an instance of a java.awt.Font class in which "DEF" is designated for a file name, more specifically a bytecode corresponding to the tenth line 'newFont("DEF",FONT.PLAIN, 32)' in the source code shown in FIG. 17, appears, the program processing unit 608 instructs the FontObject generation unit 607 to generate a FontObject.

When receiving the instruction to generate the FontObject from the program processing unit 608, the FontObject generation unit 607 generates an instance of a java.awt.Font class, records the generated instance in the FontObject recording memory 613, and returns the recorded instance to the program processing unit 608.

The FontObject recording memory 613 is arranged in the Java Heap Area, and includes an area where an instance of a java.awt.Font class is stored and an area where a font file is stored.

When receiving the notification of the font identifier "ComicSans.pfr" from the service switch detection unit 610, the link switch unit 606 obtains a font file identified by the font identifier "ComicSans.pfr", specifically a file "ComicSans.pfr", from the file system recording memory 603, and records the file in the FontObject recording memory 613.

When a bytecode of an instruction to render a character string that designated the FontObject, more specifically a bytecode corresponding to the $31^{st}$ line 'g.drawString ("HelloWorld.¥n");' in the source code shown in FIG. 17, appears, the program processing unit 608 gives the font rendering unit 612 the FontObject and instructs the font rendering unit 612 to render the character string "HelloWorld.¥n".

When the font rendering unit 612 is given the FontObject and instructed to render the character string "HelloWorld.¥n" by the program processing unit 608, the font rendering unit 612 generates an image of the character string "HelloWorld.¥n" using the font file "ComicSans.pfr" recorded in the FontObject recording memory 613.

In this condition, operation at a time of continuously selecting the PMT-b1 as a unit of viewing will be described.

The service information processing unit 609 obtains the PMT-b1 from the service information recording memory 604. The service information processing unit 609 gives the presentation processing unit 611 "a packet ID of Video Data DV-b1 that specifies AV data" included in the PMT-b1 and a packet ID of Audio Data Da-b1, and instructs the presentation processing unit 611 to reproduce the AV data. The service information processing unit 609 judges that a packet ID of the AIT-a1 is included in the PMT-b1. The service information processing unit 609 obtains the AIT-a1 from the service information recording memory 604. The service information processing unit 609 gives the program processing unit 608 the AIT-a1, and instructs the program processing unit 608 to run an application program. The service information processing unit 609 judges that a font identifier "MovieSerif.pfr" is included in the PMT-b1, and notifies the service switch detection unit 610 of the font identifier "MovieSerif.pfr".

The service switch detection unit 610 receives the notification of the font identifier "MovieSerif.pfr" from the service information processing unit 609. The service switch detection unit 610 judges that the font identifier "ComicSans.pfr" recorded in the font identifier recording memory 617 and the font identifier "MovieSerif.pfr" are not identical, notifies the link switch unit 606 of the font identifier "MovieSerif.pfr", and records the font identifier "MovieSerif.pfr" in the font identifier recording memory 617.

When receiving the notification of the font identifier "MovieSerif.pfr" from the service switch detection unit 610, the link switch unit 606 destroys a file "ComicSans.pfr" recorded in the FontObject recording memory 613, obtains a font file identified by the font identifier "MovieSerif.pfr", specifically a file "MovieSerif.pfr", from the file system recording memory 603, and records the file in the FontObject recording memory 613.

When a bytecode of an instruction to render a character string that designated the FontObject, more specifically a bytecode corresponding to the 31st line 'g.drawString ("HelloWorld.¥n");' in the source code shown in FIG. 17, appears, the program processing unit 608 gives the font rendering unit 612 the FontObject and instructs the font rendering unit 612 to render the character string "HelloWorld.¥n".

When the font rendering unit 612 is given the FontObject and instructed to render the character string "HelloWorld.¥n" by the program processing unit 608, the font rendering unit 612 generates an image of the character string "HelloWorld.¥n" using the font file "MovieSerif.pfr" recorded in the FontObject recording memory 613.

<Structure of Transmitting Apparatus>

Figure 18:
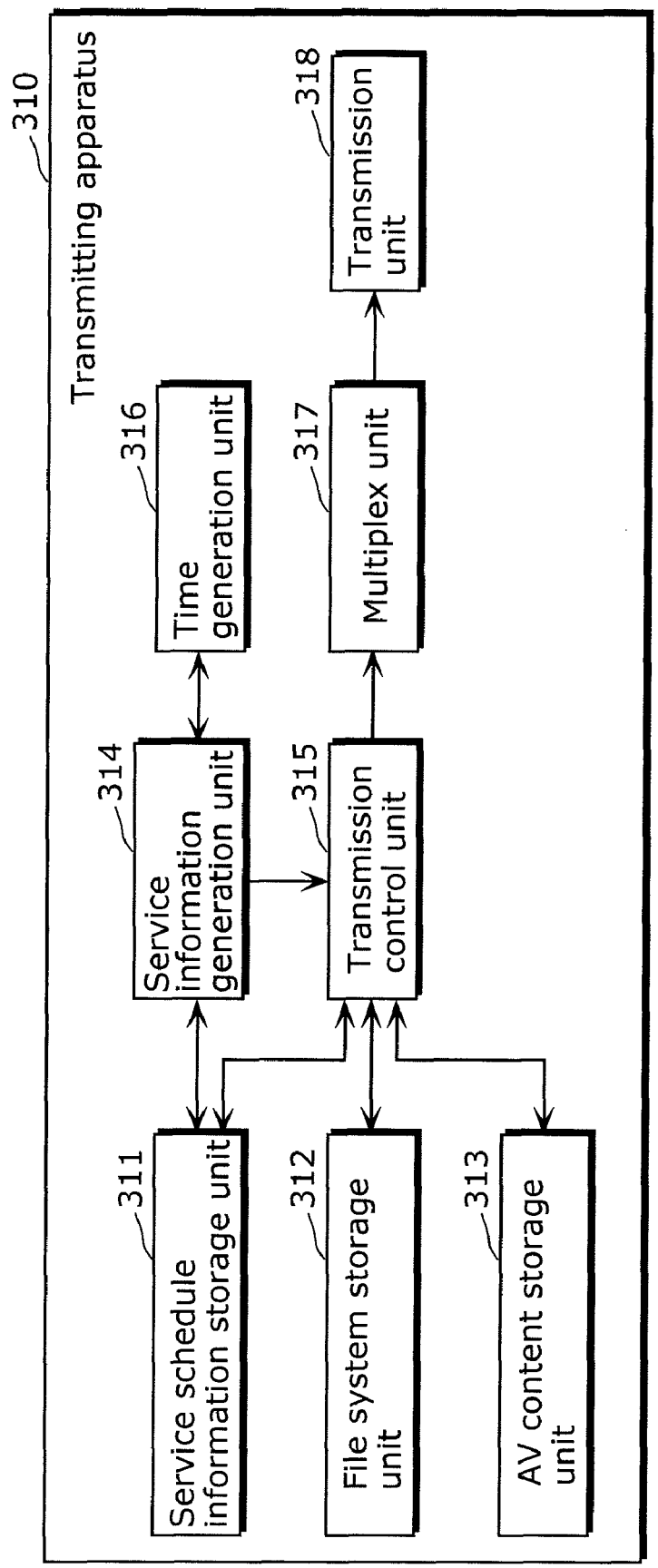
FIG. 18 is a block diagram of a transmitting apparatus according to the first embodiment.

FIG. 18 is a block diagram showing a general functional structure of a transmitting apparatus 301 according to the first embodiment. The transmitting apparatus 301 is an apparatus which transmits an MPEG transport stream, and includes: a service schedule information recording unit 311; a file system recording unit 312; an AV content recording unit 313; a service information generation unit 314; a transmission control unit 315; a time generation unit 316; a multiplexing unit 317; and a transmission unit 318.

The AV content recording unit 313 is made of a recording device such as a hard disk and an optical disk, and stores pre-digitized video and audio data. A unique serial number in which a file name and the like are included is given to each piece of the data. In the present embodiment, the each piece of the data is referred to as presentation information, and the serial number given to each piece of the presentation information is referred to as a presentation ID.

The file system recording unit 312 is made of a recording device such as a hard disk and an optical disk, and stores font data and an application program.

The time generation unit 316 generates current time.

The service schedule information recording unit 311 is made of a recording device such as a hard disk and an optical disk, and stores service schedule information. The service schedule information includes a presentation ID which identifies presentation information, a Java application file name which identifies a Java application, and a font file name which identifies a font, all of which are components of a service. In addition, the service schedule information includes transmission start time for a service which consists of these pieces of information, duration of the service, and original_network_ID, transport_stream_ID, and service_ID for specifying the service. These are defined by the DVB standard. Plural IDs may be described as a presentation ID. In consideration for delay on a broadcast path, the transmission start time is time normally 0.1 second to several seconds earlier than broadcast start time.

FIG. 19 is a diagram showing an example of service schedule information. Although data recorded in the file system recording unit 312 is identified by a file name in the present embodiment, as long as information can specify a file, other information, for example i-node of a file system and the like, may identify the file. Although original_network_ID, transport_stream_ID, and service_ID defined by the DVB standard are used as information for specifying a service in the present embodiment, as long as a service can be specified, other information, for example source_ID compliant with the OCAP standard and the like, may be used. FIG. 19 exemplifies service information in which original_network_ID, transport_stream_ID, and service_ID are identified by 0x01, 0x02, and 0x22 respectively. The service information indicates that presentation information in which a presentation ID is identified by 11 or 21, a Java application file identified by App-ab1.class, and a font file identified by ComicSans.pfr are included in a service, and the service is transmitted for 30 minutes from 8:00.

The service information generation unit 314 obtains the service schedule information from the service schedule information recording unit 311 based on time generated by the time generation unit 316, generates PMT/SDT/EIT which is service information, and notifies the transmission control unit 315 of the generated PMT/SDT/EIT.

The transmission control unit 315 refers to the service information notified from the service information generation unit 314, reads the presentation information recorded in the AV content recording unit 313 and the file recorded in the file system recording unit 312, and notifies the multiplexing unit 317 of the presentation information and the file.

Processing performed by the multiplexing unit 317 and the transmission unit 318 are well known to a person with an ordinary skill in the art.

The following further describes processing performed by the service information generation unit in detail.

The service information generation unit 314 retrieves, from the service information recorded in the service schedule information recording unit 311, service information that corresponds to the time generated by the time generation unit 316. For example, when time generated by the time generation unit 316 is "8:20", schedule No. "1" service information whose start time is "8:00" and duration is "30 minutes" is retrieved. In this case, a PMT shown in FIG. 20(A) is generated from the schedule No. "1" service information. At this time, although "0" is given as a version number, as long as the first version number is in a value range of "0" to "31", other value may be given.

Next, when time generated by the time generation unit 316 becomes "8:30", schedule No. "2" service information whose start time is "8:30" and duration is "30 minutes" is retrieved. In this case, a PMT shown in FIG. 20(B) is generated from the schedule No. "2" service information. At this time, "1" is given as a version number after a version number value is increased by 1 from the version number given to the PMT created in the previous schedule No. "1".

Subsequently, every time change of time generated by the time generation unit 316 causes the service information generation unit 314 to retrieve new service information, the service information generation unit 314 increases a version number of PMT by 1. As a result of increasing a version number, when the version number exceeds the largest value 31 which is a numeric value expressible with 5 bits that are the number of bits assigned to the version number, the version number is reset to 0. Thus, a version number transition becomes as following: 0→1→2→3→ . . . →29→30→31→0→1→2→ . . . .

It should be noted that, here, although a version number is increased by 1 at a time, a unit of increase may be equal to or more than 2. However, since the number of bits assigned to the version number is 5 bits as mentioned above, it is preferable to increase a version number by 1 at a time.

As stated above, according to the first embodiment, although an application program does not include a process code which processes font data for each unit of viewing (specifically, a process code which generates a FontObject and a process code which designates a font file), it becomes possible to change font data to be used for each unit of viewing.

Figure 21:
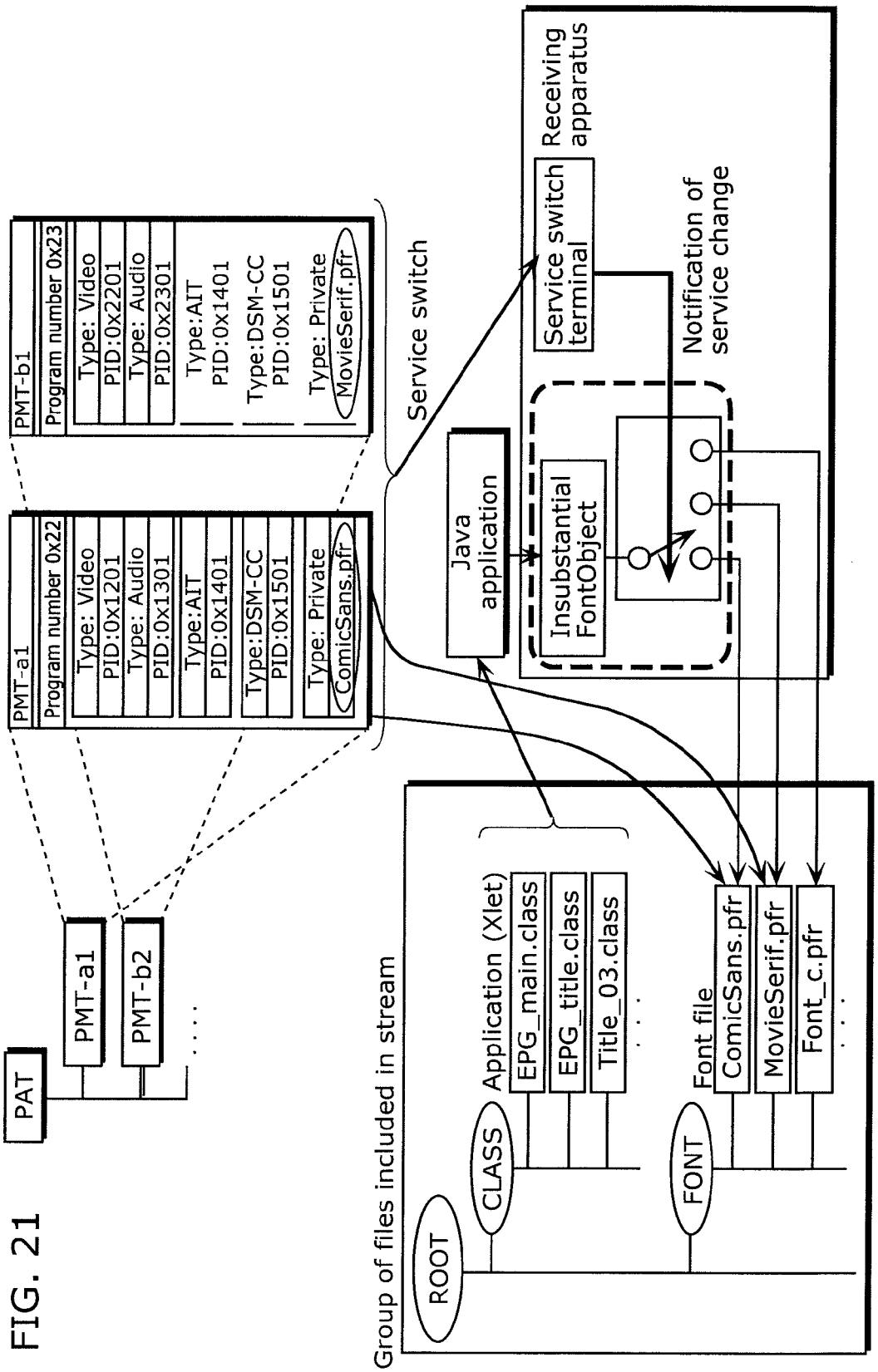
FIG. 21 is a diagram showing an outline of the first embodiment.

In other words, as shown in FIG. 21, the application program according to the first embodiment generates a virtual FontObject which is an insubstantial FontObject. When a service in currently reproduction is switched, a font file corresponding to the service is connected to the virtual FontObject.

Figure 22:
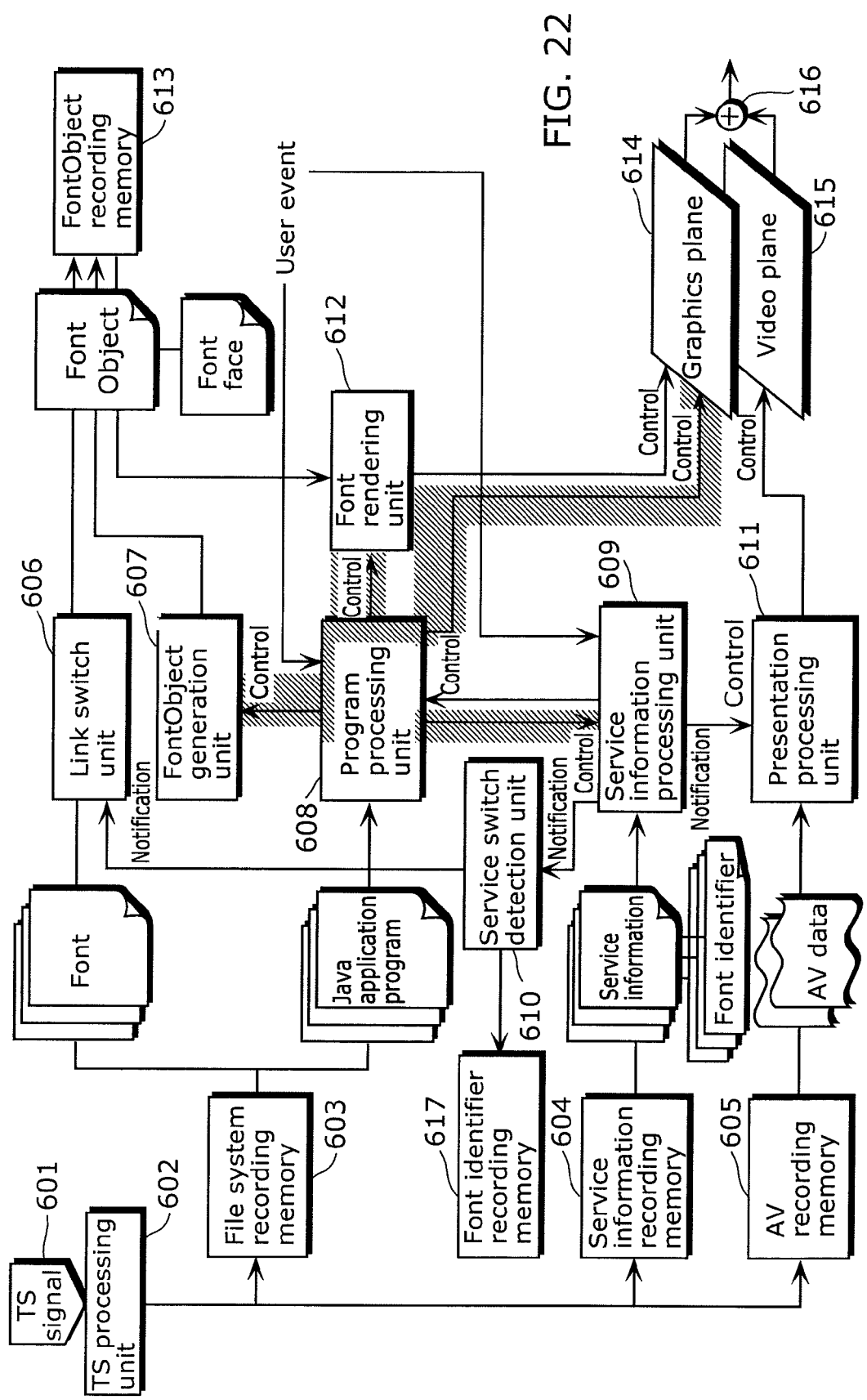
FIG. 22 is a diagram showing functions shared by an application program and a receiving apparatus.

In this manner, the application program according to the first embodiment may include a range of functions indicated by shaded region in FIG. 22 and, unlike the conventional application program, does not need to include functions for detecting service switch and the like. That is to say, according to the first embodiment, a receiving apparatus (middleware) is enabled to perform a process conventionally performed by the application program.

It should be noted that, although when the bytecode generated by the instance of the java.awt.Font class in which "DEF" is designated for the font name appears the FontObject generation unit 607 is instructed to generate the FontObject in the first embodiment, even when the font name is not "DEF" but other specific character string, the present invention is practicable.

It should be noted that, although, when the bytecode generated by the instance of the java.awt.Font class in which "DEF" is designated for the font name appears, the FontObject generation unit 607 is instructed to generate the FontObject in the first embodiment, even when the bytecode generated by the instance of the java.awt.Font class is not used, the present invention is practicable by using a bytecode generated by an instance of a java.awt.Font class or its subclass or a bytecode of a method whose return value is the java.awt.Font class or its subclass.

It should be noted that, although the application program is an application program expressed in the Java™ bytecode in the first embodiment, even when the application program is expressed in other format, the present invention is practicable.

It should be noted that, although the DVB service is shown as the unit of viewing in the first embodiment, even when the unit of viewing is an MPEG program, an OCAP service or other unit of viewing, the present invention is practicable.

It should be noted that, although the MPEG transport stream transmitted by the transmitting apparatus is obtained in the first embodiment, even when an MPEG transport stream is obtained from an information recording medium, the present invention is practicable.

It should be noted that, although the font file is the font face in the first embodiment, the present invention is practicable by using data whose font file is converted into other format as long as the data can be rasterized.

It should be noted that, although the area where the font face is stored is arranged in the Java Heap area in the first embodiment, the present invention is practicable by using other area as long as the area can be rasterized.

It should be noted that, although the font is switched after the completion of obtaining the PMT in the first embodiment, a font can be switched without waiting for completion of obtaining a PMT as long as the PMT is cached. That is to say, when the PMT is cached in a recording unit, such as the service information recording memory 604, it becomes possible to reduce delay of a time from when a service is switched until when a font is switched.

It should be noted that, although a timing to connect the insubstantial FontObject and the font file is at a time of service switch in the first embodiment, the timing to connect may be at a time of font rendering. Similarly, although a timing to generate the insubstantial FontObject is at a time of service switch, the timing may be at a time of font rendering.

It should be noted that, although the font identifier is included in the PMT in the first embodiment, the present invention is practicable by using a SDT, an EIT or other table in DVB as long as a font identifier can be designated for each unit of viewing.

Figure 23:
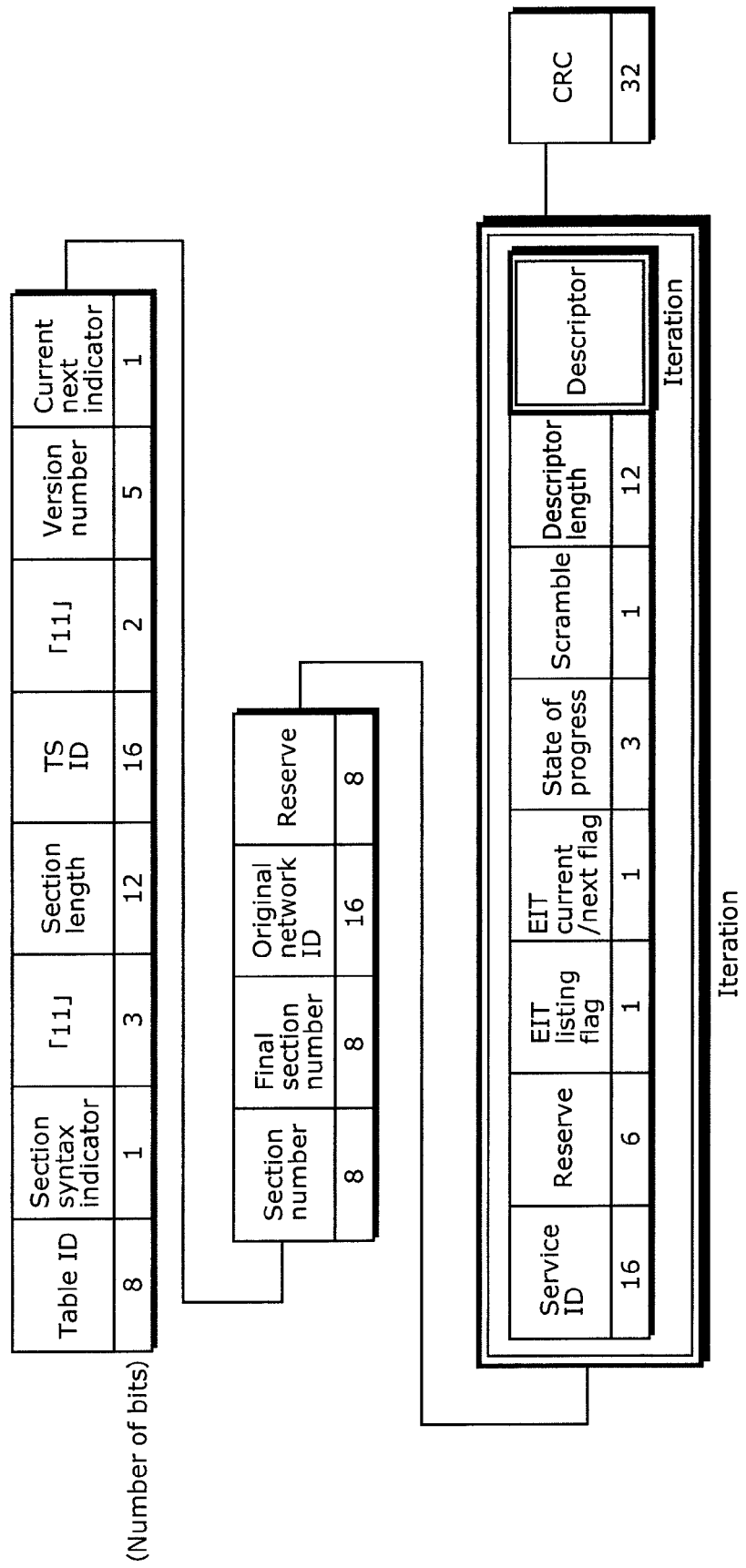
FIG. 23 is a diagram showing a data structure of a SDT.

FIG. 23 is a diagram showing a data structure of a SDT according to the present invention.

Service information is described in a Service Description Table (SDT). The term "service" is synonymous with the term "program" and the term "channel". A packet ID of the SDT is fixed to 0x0011. A table ID is 0x42 for a network and 0x46 for other network. A version number is added every time a content of the table is updated. A current next indicator is used for identification in transmitting a current version and next version simultaneously. Presence or absence of a scramble regarding a multiplexed service in a transport stream is described in the SDT. A service name, service content, service type, and the like of the service in addition to a font identifier are described in a Descriptor. Associating the SDT with a PMT is performed by making a service ID of the SDT and a program number of the PMT the same value. The structure of and a method for obtaining the SDT are well known to a person with an ordinary skill in the art.

Figure 24:
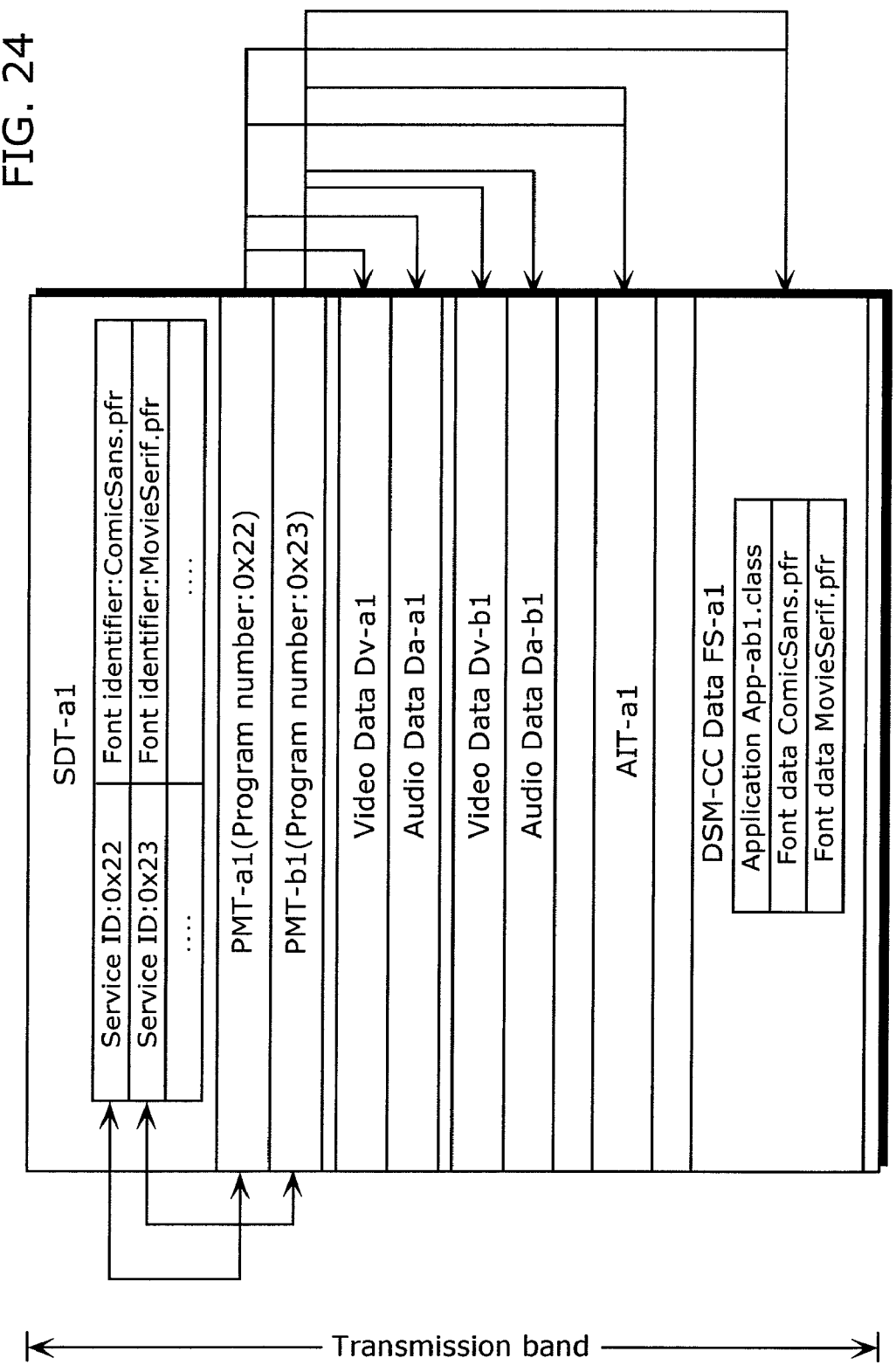
FIG. 24 is a view showing a frame format of an MPEG transport stream including a SDT.

FIG. 24 is a view showing a frame format of an MPEG transport stream including a SDT. The MPEG transport stream includes two DVB services with respective service IDs 0x22 and 0x23. The service ID 0x22 is associated with PMT-a1, and the service ID 0x23 is associated with PMT-b1. The PMT-a1 designates, as components of Service-A, Video Data DV-a1, Audio Data Da-a1, AIT-a1, DSM-CC Data FS-a1, and the PMT-b1 designates, as components of Service-B, Video Data Dv-b1, Audio Data Dv-b1, and DSM-CC Data FS-a1. This point is as already described.

Figure 25:
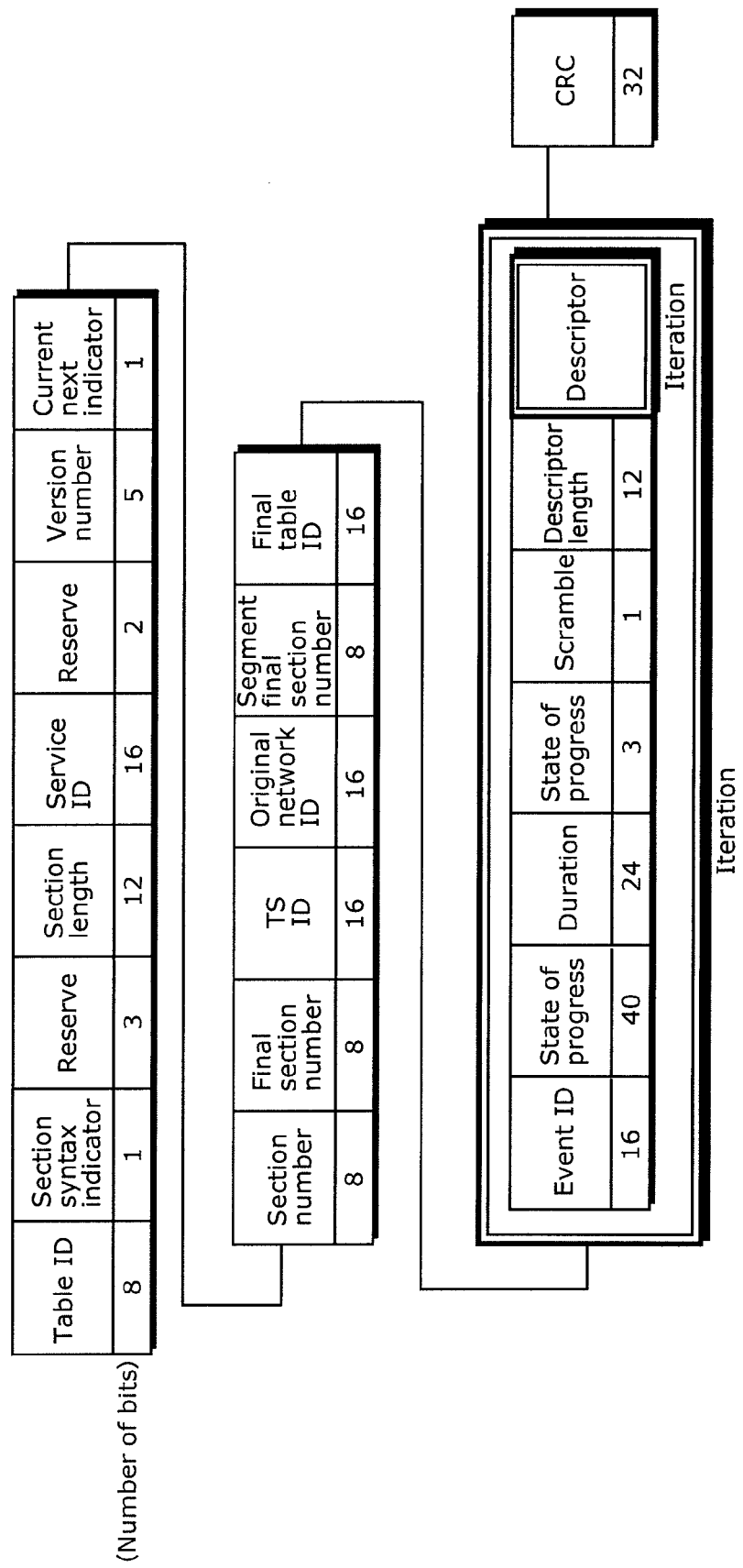
FIG. 25 is a diagram showing a data structure of an EIT.

FIG. 25 is a diagram showing a data structure of an EIT according to the present invention.

Even information is described in an Even Information Table (EIT). The term "event" is synonymous with the term "program". A packet ID of the EIT is fixed to 0x0012. A table ID is 0x4E for a network and 0x4F for other network. A version number is added every time a content of the table is updated. A current next indicator is used for identification in transmitting a current version and next version simultaneously. Concerning event information making up one service, start time and duration of the event, presence or absence of scramble, and the like are described in the EIT. A program name, a synopsis, and the like of the event in addition to a font identifier are described in a Descriptor. Associating the EIT with a PMT is performed by making a service ID of the EIT and a program number of the PMT the same value. The structure of and a method for obtaining the EIT are well known to a person with an ordinary skill in the art.

Figure 26:
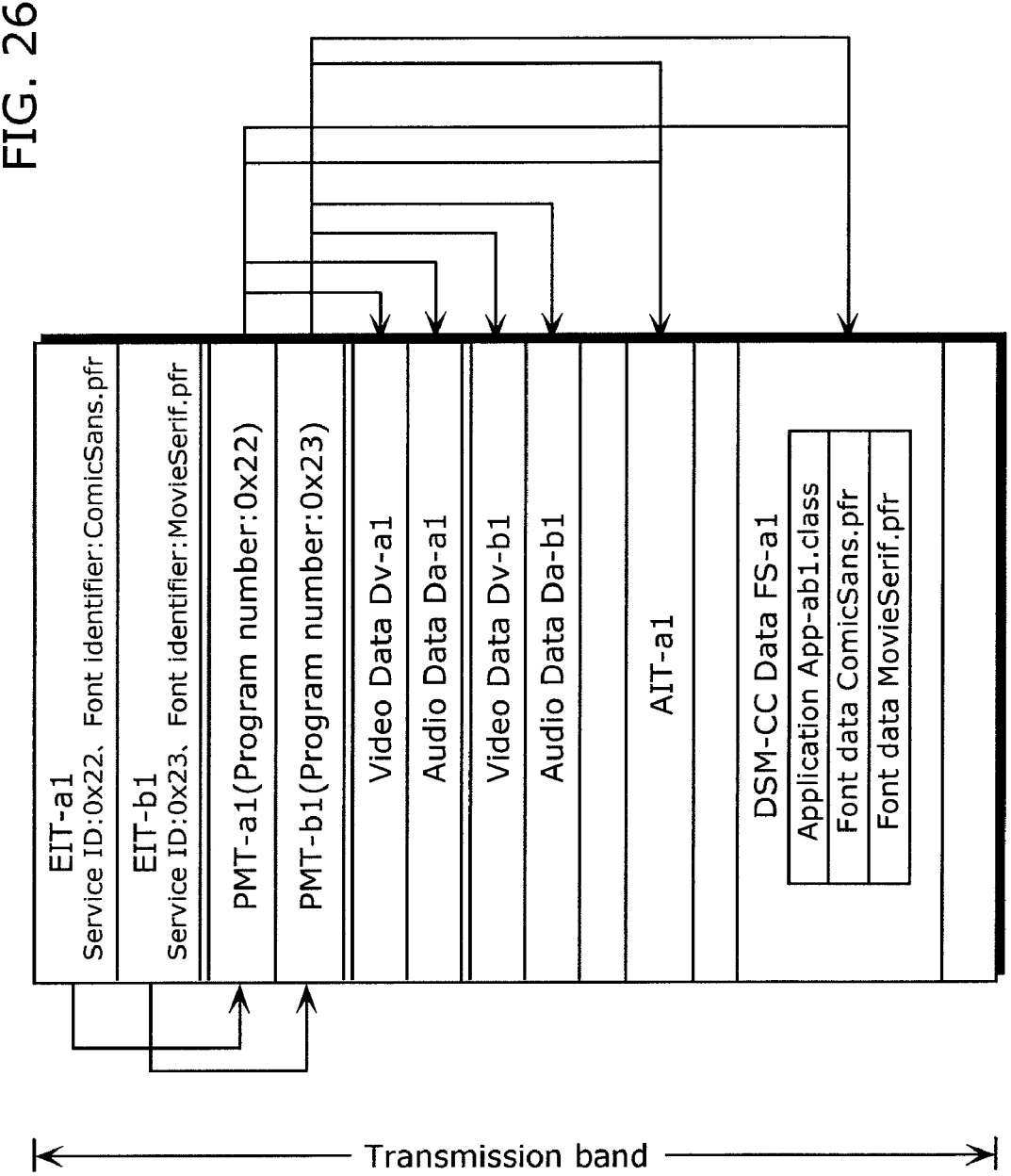
FIG. 26 is a view showing a frame format of an MPEG transport stream including an EIT.

FIG. 26 is a view showing a frame format of an MPEG transport stream including an EIT. The MPEG transport stream includes two DVB services with respective service IDs 0x22 and 0x23. The service ID 0x22 is associated with PMT-a1, and the service ID 0x23 is associated with PMT-b1. The PMT-a1 designates, as components of Service-A, Video Data Dv-a1, Audio Data Da-a1, AIT-a1, DSM-CC Data FS-a1, and the PMT-b1 designates, as components of Service-B, Video Data Dv-b1, Audio Data Da-b1, AIT-a1, and DSM-CC Data FS-a1. This point is as already described.

As stated above, since it is possible to designate a font identifier for each unit of viewing even with the SDT and the EIT, the same effect as in the case of using the PMT can be obtained. It should be noted that since a method for processing upgraded data of the SDT and the EIT is same as a method of processing upgraded data of the PMT, a description of the former method is not given here.

Second Embodiment

Next, a second embodiment of the present invention will be described.

Although the font data, the application program, and the font identifier for identifying font data to be used by the application program are included in the MPEG transport stream in the first embodiment, the second embodiment shows a configuration of reading an information recording medium where font data, an application program, and a font identifier for identifying font data to be used by the application program are included in a file system.

<Structure of Recording Medium>

Figure 27:
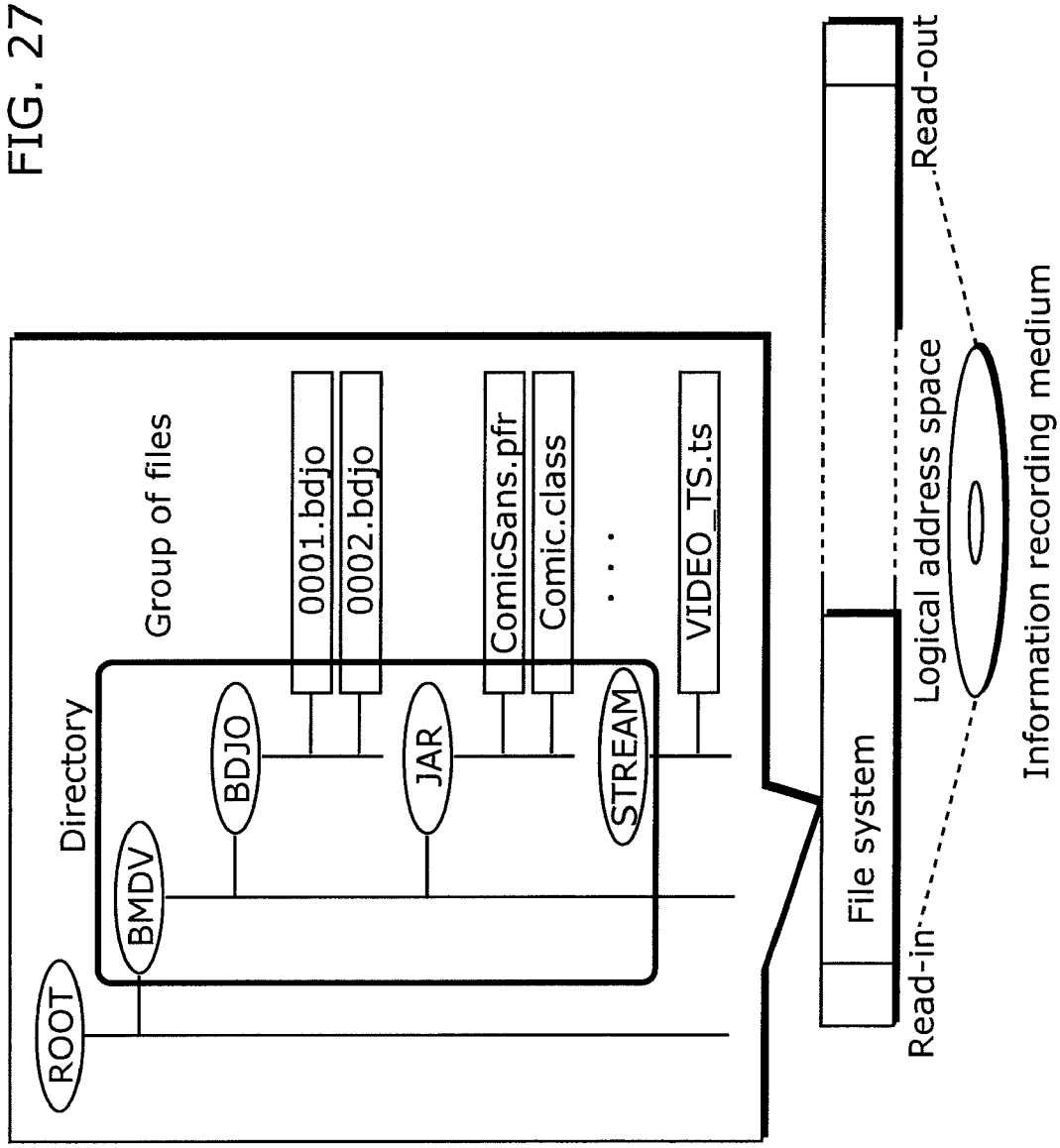
FIG. 27 is a view showing a frame format of a recording method according to a second embodiment.

FIG. 27 shows a view showing a frame format of a data recording method of the information recording medium according to the second embodiment. In the present embodiment, a DVD recording method is a basis of the data recording method, and a director BDJO is added to a file system. Tables 0001.bdjo and 0002.bdjo for identifying a unit of viewing are stored in the directory BDJO.

FIG. 28 is a view showing respective frame formats of the 0001.bdjo and the 0002.bdjo. A unit of viewing "animation match-up" is expressed by the 0001.bdjo. Information of AV data to be reproduced "VIDEO_TS.ts", information of a start-up application "App-ab1.class", a font identifier "Comic-Sans.pfr" which indicates font data to be used by an application program in the unit of viewing "animation match-up", and the like are included in the 0001.bdjo. A unit of viewing "movie review" is expressed by the 0002.bdjo. Information of AV data to be reproduced "VIDEO_TS-2.ts", information of a start-up application "App-ab1.class", a font identifier "MovieSerif.pfr" which indicates font data to be used by an application program in the unit of viewing "movie review", and the like are included in the 0002.bdjo. Apart from a point that the directory BMJO is added, the data recording method of the information recording medium according to the second embodiment is same as the DVD recording method, and is well known to a person with an ordinary skill in the art.

<Structure of Reproducing Apparatus>

Figure 29:
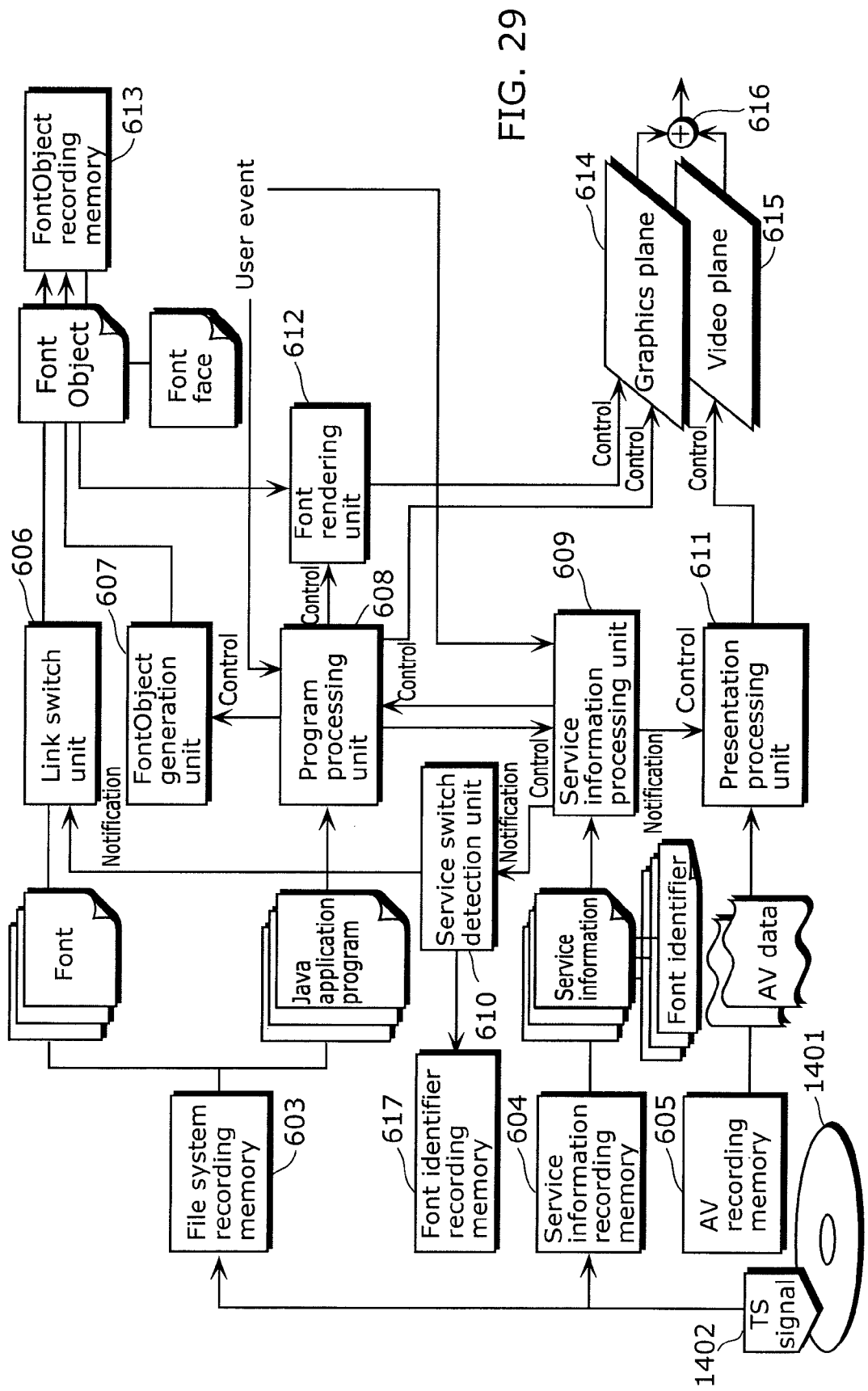
FIG. 29 is a block diagram of a reproducing apparatus according to the second embodiment.

FIG. 29 is a block diagram showing a general functional structure of a reproducing apparatus according to the second embodiment. The term reproducing apparatus here is equivalent to an output device according to the present invention.

Font data, an application program, a font identifier for identifying font data to be used by the application program, and AV data as an MPEG transport stream are recorded in a file system of an information recording medium 1401.

A reading unit 1402 is equivalent to a reading unit according to the present invention. That is to say, the reading unit 1402 reads data on the information recording medium 1401. Each piece of the read data is recorded in respective dedicated memories based on a type of the each piece of data. Font data and an application program are recorded in a file system recording memory 603, service information such as the table 0001.bdjo for identifying a unit of viewing is recorded in the service information recording memory 604, and AV data such as video and audio is recorded in the AV recording memory 605, respectively.

Respective structures of the service information processing unit 609 and the presentation processing unit 611 and a dialogue between each processing unit are same as in the first embodiment.

As mentioned above, although the second embodiment differs from the first embodiment in that the MPEG transport stream is not received but the information recording medium is read, other points are same as in the first embodiment. Accordingly, although an application program does not include a process code which processes font data for each unit of viewing, it becomes possible to change font data to be used for each unit of viewing.

Figure 30:
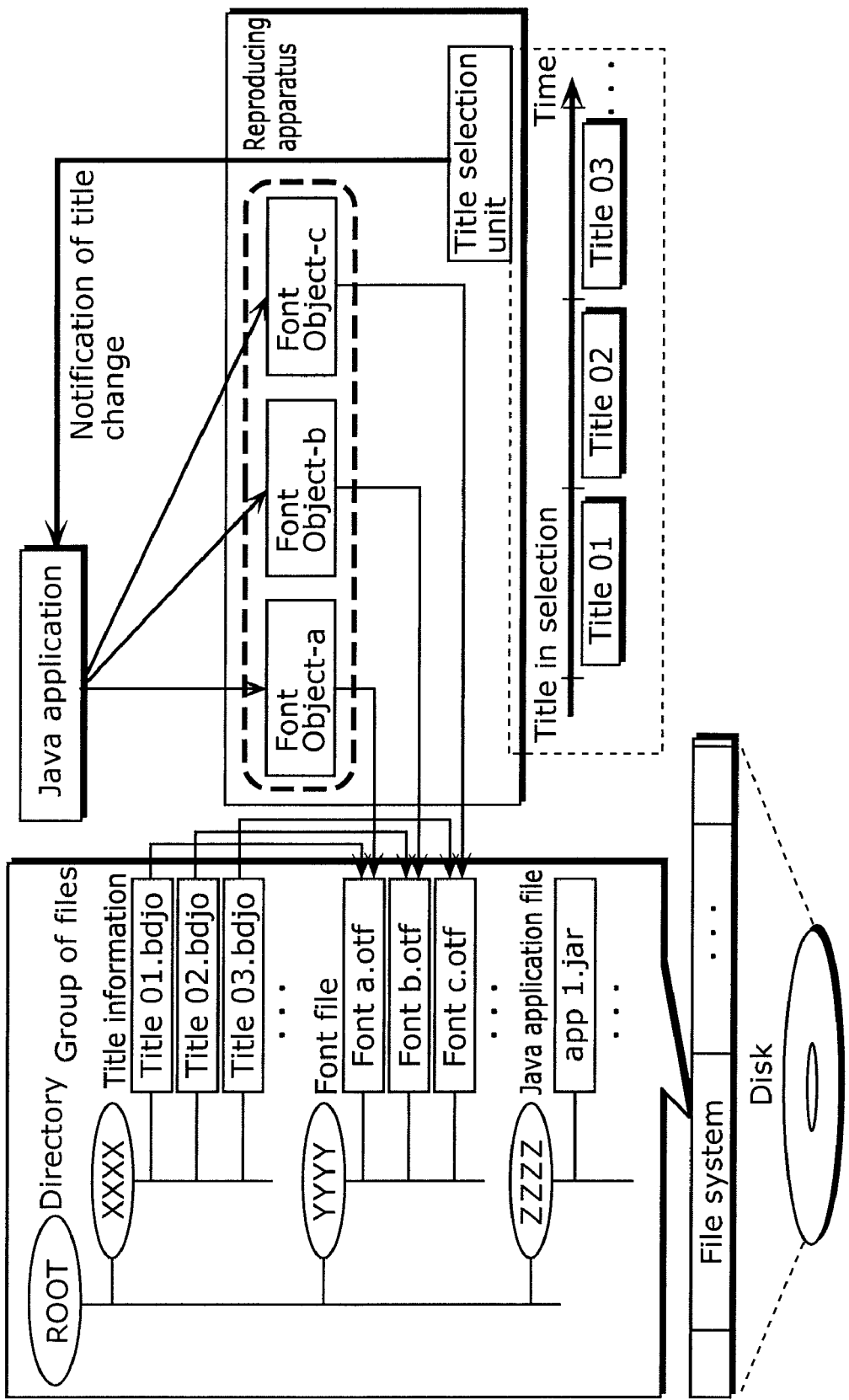
FIG. 30 is a diagram showing a conventional outline.
Figure 31:
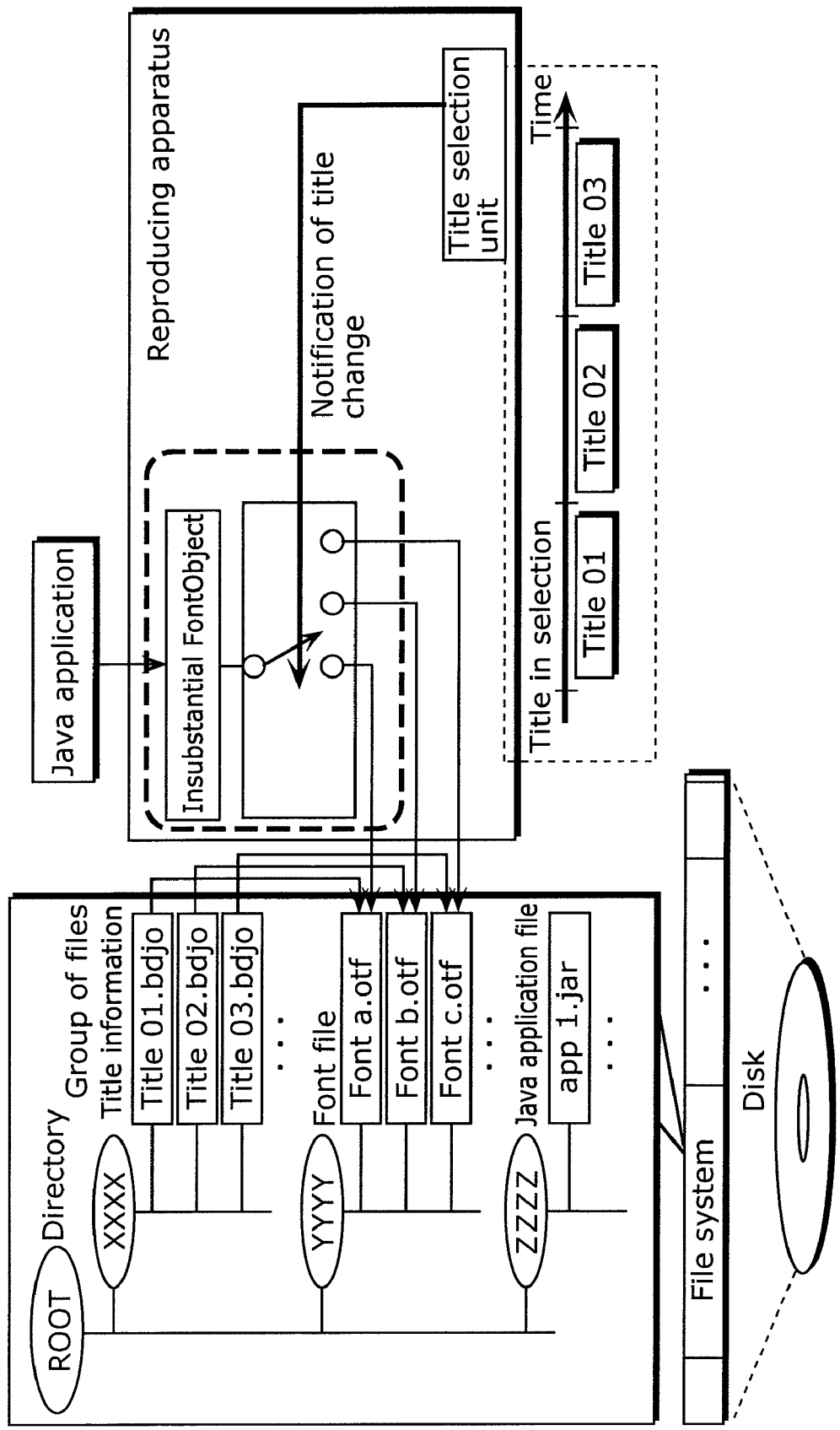
FIG. 31 is a diagram showing an outline of the second embodiment.

In other words, as shown in FIG. 30, a conventional application program had to associate a font to be used for rendering with a FontObject and to create and hold the font in advance. On the other hand, as shown in FIG. 31, the application program according to the second embodiment generates a virtual FontObject. When a title (service) is switched, a font file corresponding to the title is connected to the virtual FontObject (a title selection unit in FIG. 31 is equivalent to the switch detection unit according to the present invention). In this manner, similar to the first embodiment, according to the second embodiment also, a receiving apparatus (middleware) is enabled to perform a process conventionally performed by the application program.

It should be noted that, although a DVD is used as the basis of the recording method in which data is recorded in a recording medium in the second embodiment, as long as other recording method includes units of viewing and can store a font identifier which can identify font data to be used for each unit of viewing, even when it is the basis of the recording method, the present invention is practicable.

It should be noted that, although the application program is expressed in the Java™ bytecode in the second embodiment, even when the application program is expressed in other format, the present invention is practicable.

It should be noted that, although it is shown that the font identifier is stored in the table which identifies the unit of viewing in the second embodiment, as long as a font identifier can be designated for each unit of viewing, even when the font identifier is stored in other table, the present invention is practicable.

INDUSTRIAL APPLICABILITY

The present invention is useful as a technique for switching font data to be used for rendering for each unit of viewing. The technique for switching can be applied not only to digital broadcast systems, digital TV receivers, digital content reproduction equipment, but also to information equipment controlled by software such as personal computers and mobile phones.

The invention claimed is:

1. A receiving apparatus which receives a broadcast, said apparatus comprising:
   a receiver that receives the broadcast;
   an outputter that outputs a service included in a received broadcast;
   an executer that executes an application program included in the received broadcast;
   an extractor that extracts, from service information included in the received broadcast, a font identifier that identifies font data corresponding to the service;
   a switch detector that detects that a currently outputted service is switched;
   a link switcher that adopts, as font data to be used by the application program, font data identified by a font identifier corresponding to the currently outputted service to which switching is detected by said switch detector;
   a recording medium on which the font identifier corresponding to the currently outputted service is recorded; and
   a renderer that renders the font data to be used by the application program,
   wherein said switch detector detects the switching by comparing the font identifier recorded in said recording medium and the font identifier extracted by said extractor, and stores the font identifier extracted by said extractor in said recording medium, when the font identifier recorded in said second information recording medium is different from the font identifier extracted by said extractor.

2. The receiving apparatus according to claim 1, wherein the application program generates a virtual FontObject which is an insubstantial FontObject, and said link switcher adopts the font data identified by the font identifier, as the font data to be used by the application program, by connecting, to the virtual FontObject, the font data identified by the font identifier corresponding to the currently outputted service.

3. The receiving apparatus according to claim 2, wherein the application program generates the virtual FontObject at one of a time of service switching and a time of font rendering.

4. The receiving apparatus according to claim 1, wherein said extractor extracts the font identifier that identifies the font data corresponding to the service from one of a Program Map Table (PMT), a Service Description Table (SDT) and an Event Information Table (EIT), each of the PMT, the SDT and the EIT being included in the received broadcast.

5. The receiving apparatus according to claim 1, further comprising:
   a recorder that caches one of a Program Map Table (PMT), a Service Description Table (SDT) and Event Information Table (EIT), each of the PMT, the SDT and the EIT being included in the received broadcast,
   wherein said extractor extracts the font identifier that identifies the font data corresponding to the service from one of the cached PMT, SDT and EIT.

6. The receiving apparatus according to claim 1, wherein said link switcher adopts, as the font data to be used by the application program, the font data identified by the font identifier corresponding to the currently outputted service, at one of a time of service switching and a time of font rendering.

7. An output apparatus which outputs a title, said apparatus comprising:
   a reader that reads a first information recording medium;
   an outputter that outputs a title recorded in the first information recording medium;
   an executor that executes an application program recorded in the first information recording medium;
   an extractor that extracts, from title information recorded in the first information recording medium, a font identifier that identifies font data corresponding to the title;
   a switch detector that detects that a currently outputted title is switched;
   a link switcher that adopts, as font data to be used by the application program, font data identified by a font identifier corresponding to the currently outputted title to which switching is detected by said switch detector;

a second information recording medium on which the font identifier corresponding to the currently outputted title is recorded; and
a renderer that renders the font data to be used by the application program,
wherein said switch detector detects the switching by comparing the font identifier recorded in said second information recording medium and the font identifier extracted by said extractor, and stores the font identifier extracted by said extractor in said second information recording medium, when the font identifier recorded in said second information recording medium is different from the font identifier extracted by said extractor.

8. A method for receiving a broadcast, said method comprising:
receiving the broadcast;
outputting a service included in a received broadcast;
executing an application program included in the received broadcast;
extracting, from service information included in the received broadcast, a font identifier that identifies font data corresponding to the service;
detecting by a switch detector that a currently outputted service is switched;
adopting by a link switcher, as font data to be used by the application program, font data identified by a font identifier corresponding to the currently outputted service to which switching is detected;
recording the font identifier corresponding to the currently outputted service; and
rendering the font data to be used by the application program,
wherein, in said detecting that the currently outputted service is switched, the switching is detected by comparing the font identifier recorded in said recording and the font identifier extracted in said extracting, the extracted font identifier being stored when the recorded font identifier differs from the extracted font identifier.

9. A non-transitory recording medium in which a program for receiving a broadcast is recorded, said program recorded in the recording medium causing a computer to execute acts of:
receiving the broadcast;
outputting a service included in the received broadcast;
executing an application program included in the received broadcast;
extracting, from service information included in the received broadcast, a font identifier which is information for identifying font data corresponding to the service;
detecting by a switch detector that a currently outputted service is switched;
adopting by a link switcher, as font data to be used by the application program, font data identified by a font identifier corresponding to the currently outputted service to which switching is detected;
recording the font identifier corresponding to the currently outputted service; and
rendering the font data to be used by the application program,
wherein, in said detecting that the currently outputted service is switched, the switching is detected by comparing the font identifier recorded in said recording and the font identifier extracted in said extracting, the extracted font identifier being stored when the recorded font identifier differs from the extracted font identifier.

10. A transmission apparatus which transmits a broadcast, said apparatus comprising:
a generator that generates service information including a font identifier that identifies font data corresponding to a service; and
a transmitter that transmits a broadcast including generated service information, the service, and an application program,
wherein the broadcast is received by a receiving apparatus, the receiving apparatus comprising:
an extractor that extracts the font identifier that identifies font data corresponding to the service;
a recorder that records a font identifier corresponding to a currently outputted service;
a switch detector that detects the switching by comparing a recorded font identifier and an extracted font identifier
a link switcher that adopts, as font data to be used by the application program, font data identified by a font identifier corresponding to the currently outputted title to which switching is detected by said switch detector; wherein the font identifier extracted by said extractor is stored in said recorder when the font identifier recorded in said recorder is different from the font identifier extracted by said extractor.

11. A digital broadcast system which includes a transmission apparatus that transmits a broadcast and a receiving apparatus that receives a broadcast,
wherein said transmission apparatus includes:
a generator that generates service information including a font identifier that identifies font data corresponding to a service; and
a transmitter that transmits a broadcast including generated service information, the service, and an application program, and
said receiving apparatus includes:
a receiver that receives the broadcast;
an outputter that outputs a service included in a received broadcast;
an executer that executes an application program included in the received broadcast;
an extractor that extracts, from service information included in the received broadcast, the font identifier that identifies font data corresponding to the service;
a switch detector that detects that a currently outputted service is switched;
a link switcher that adopts, as font data to be used by the application program, font data identified by a font identifier corresponding to the currently outputted service to which switching is detected by said switch detector;
a recording medium on which the font identifier corresponding to the currently outputted service; and
a renderer that renders the font data to be used by the application program,
wherein said switch detector that detects the switching by comparing the font identifier recorded in said recording medium and the font identifier extracted by said extractor, and stores the font identifier extracted by said extractor in said recording medium, when the font identifier recorded in said second information recording medium is different from the font identifier extracted by said extractor.

* * * * *